(12) United States Patent
Okunishi et al.

(10) Patent No.: US 7,164,621 B2
(45) Date of Patent: Jan. 16, 2007

(54) UNDERWATER SOUNDING APPARATUS

(75) Inventors: Akira Okunishi, Nishinomiya (JP);
Yasushi Nishimori, Nishinomiya (JP);
Yasuo Ito, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 227 days.

(21) Appl. No.: 10/995,268

(22) Filed: Nov. 24, 2004

(65) Prior Publication Data

US 2005/0117755 A1 Jun. 2, 2005

(30) Foreign Application Priority Data

Nov. 28, 2003 (JP) .............................. 2003-399235

(51) Int. Cl.
*G01S 7/52* (2006.01)
*G01S 15/00* (2006.01)

(52) U.S. Cl. ..................... 367/131; 367/901; 381/71.1; 381/94.1

(58) Field of Classification Search ................ 367/131, 367/901; 381/71.1, 94.1
See application file for complete search history.

(56) References Cited

U.S. PATENT DOCUMENTS 4,310,904 A * 1/1982 Ballard et al. ............... 367/131
4,934,483 A * 6/1990 Kallergis .................... 381/71.1
5,789,678 A * 8/1998 Pla ............................. 381/71.1
6,108,269 A * 8/2000 Kabel .......................... 367/98

FOREIGN PATENT DOCUMENTS

| JP | 3-17583 A | 1/1991 |
|---|---|---|
| JP | 2001-343450 A | 12/2001 |
| JP | 2003-84060 A | 3/2003 |
| JP | 2003-202370 A | 7/2003 |

* cited by examiner

*Primary Examiner*—Ian J. Lobo
(74) *Attorney, Agent, or Firm*—Birch, Stewart, Kolasch & Birch, LLP

(57) ABSTRACT

While keeping a propeller located in a negative direction of a y-axis turning, transmission of acoustic waves from vibrating elements of a transducer unit is interrupted. Reference signals "A" and "B" which are receiving beam signals having principal acoustic axes oriented in a propeller direction are generated from received signals obtained by "A" and "B" group vibrating elements, respectively. Next, adjustment factors used for removing propeller noise from received signals obtained by vibrating elements on positive and negative sides of an x-axis are calculated by performing arithmetic operation on time-series data on the received signals obtained by the positive and negative sides vibrating elements and on time-series data on the reference signals "A" and "B", respectively. When performing underwater sounding operation by transmitting acoustic waves, a product of the reference signal "A" or "B" and the adjustment factor is subtracted from the received signal obtained by each of the positive and negative sides vibrating elements, respectively.

8 Claims, 19 Drawing Sheets

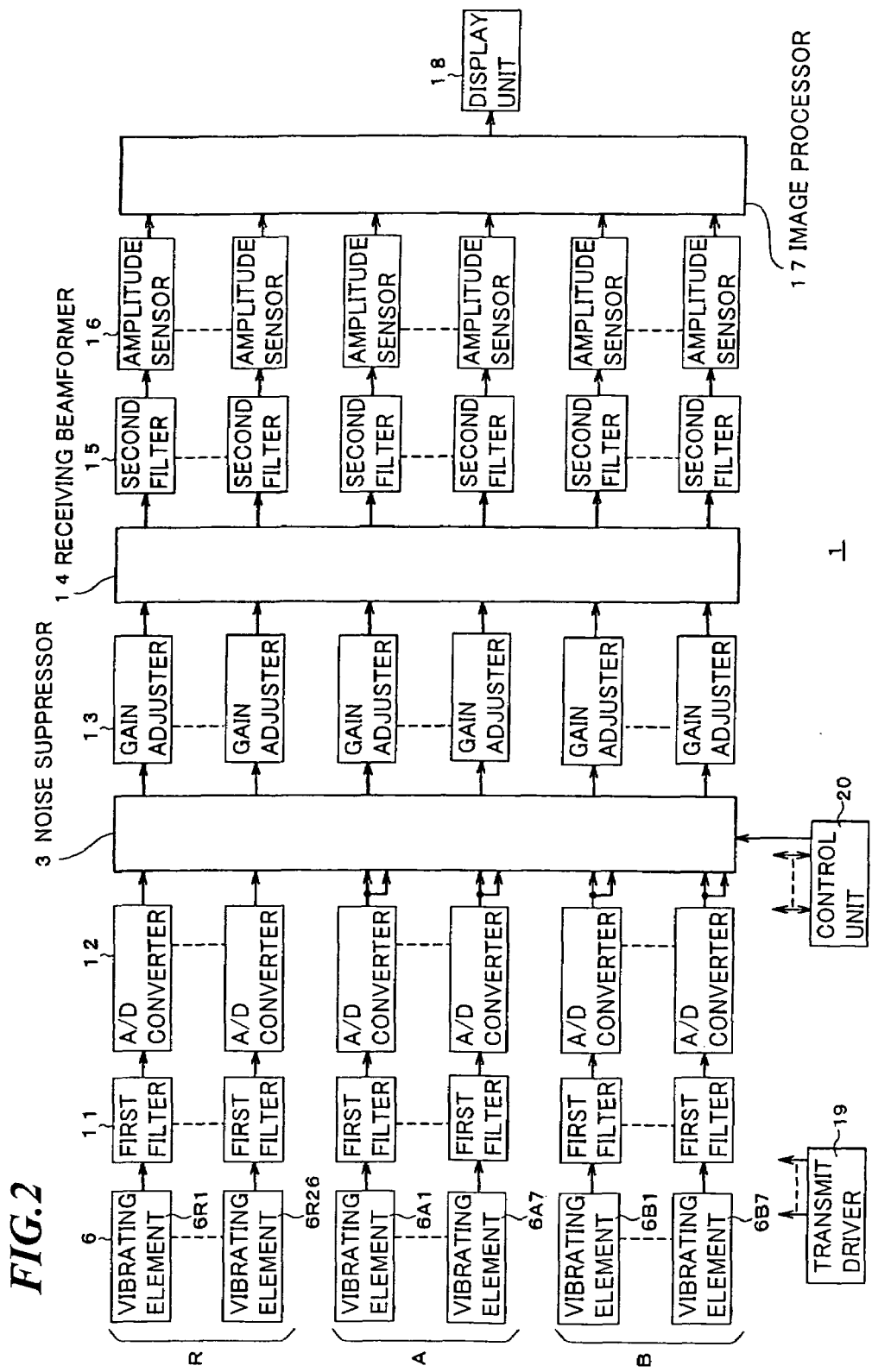

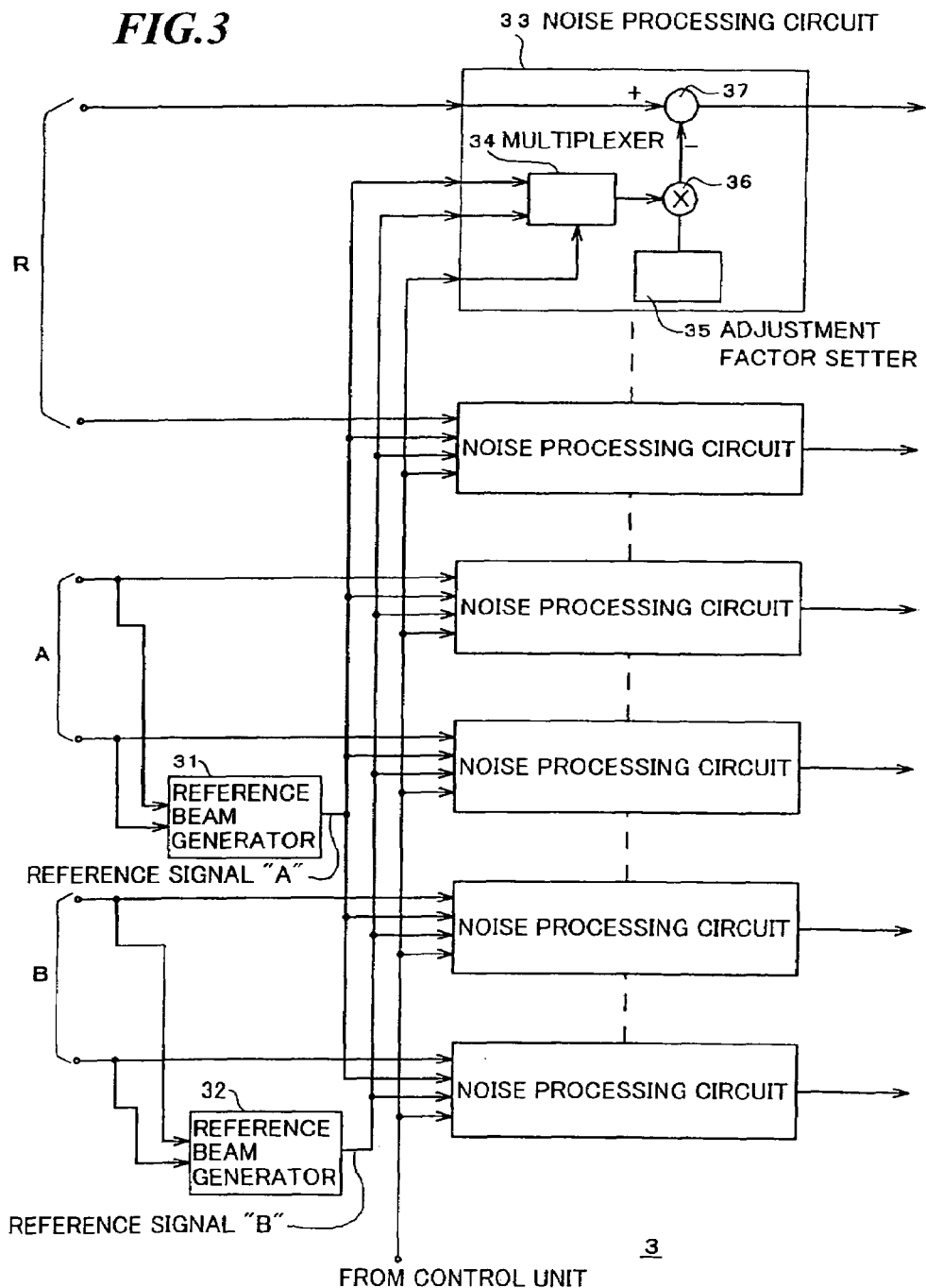

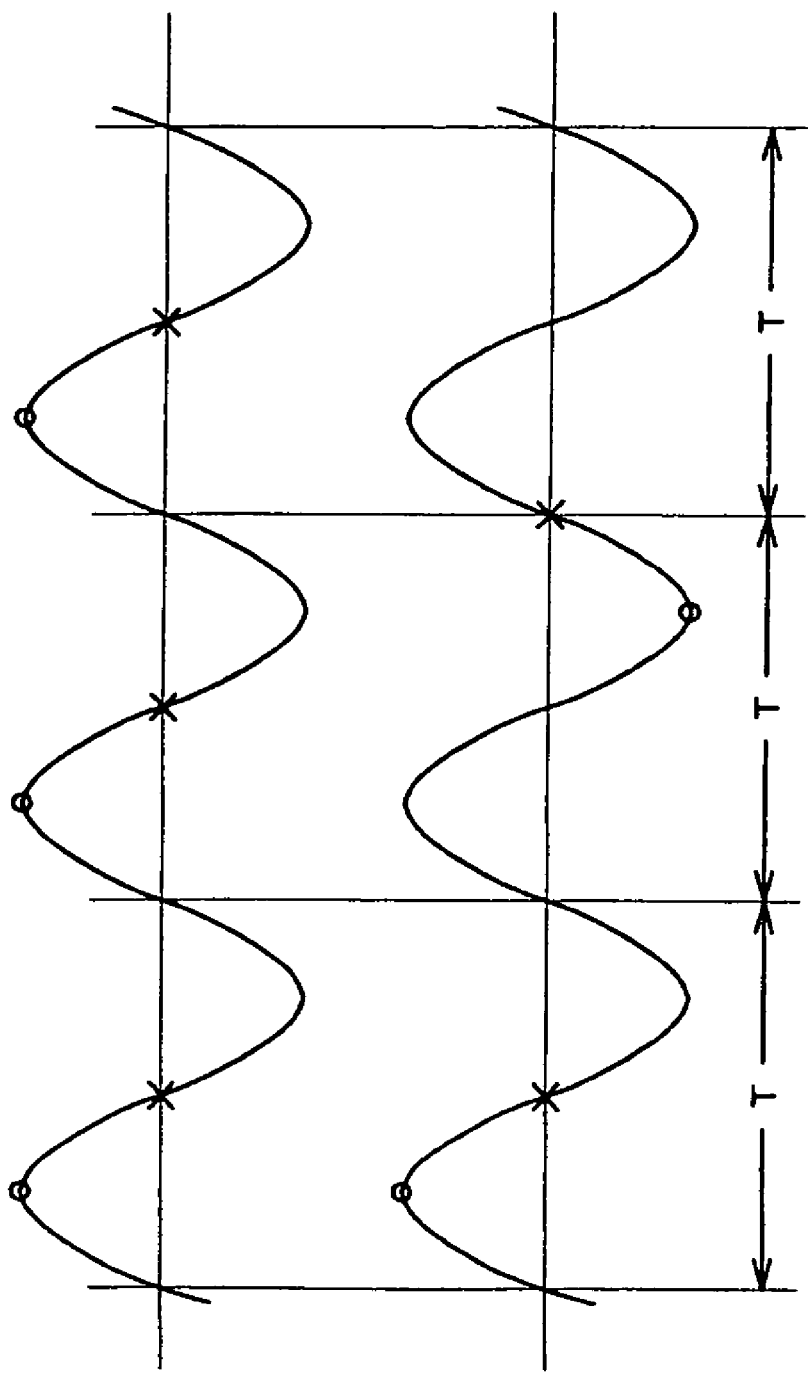

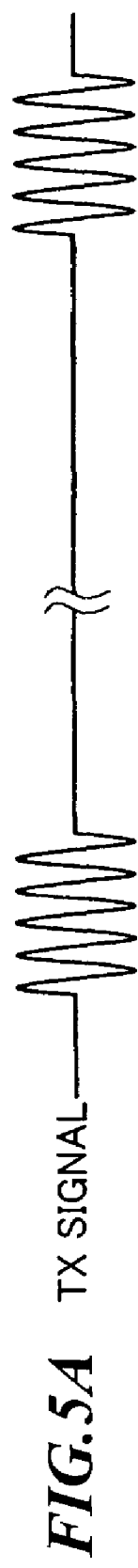
FIG.5A TX SIGNAL
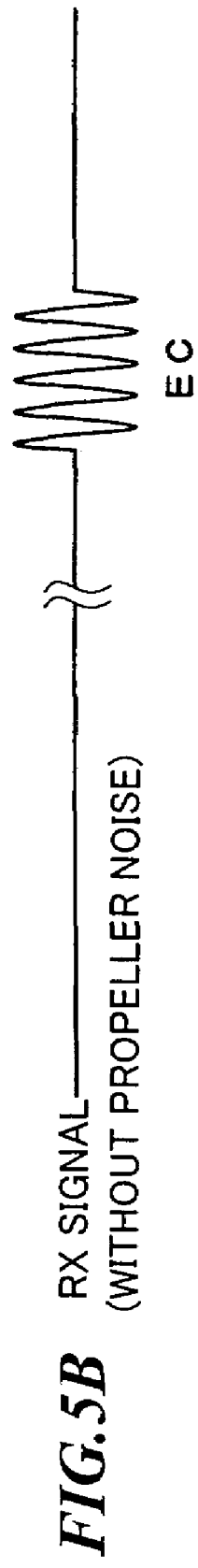
FIG.5B RX SIGNAL (WITHOUT PROPELLER NOISE)
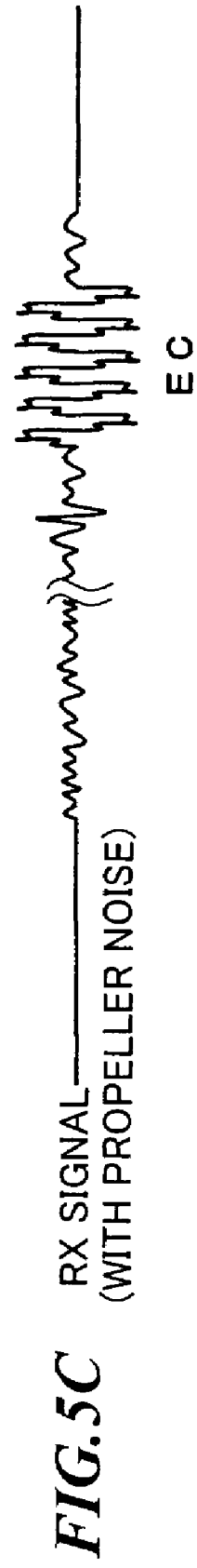
FIG.5C RX SIGNAL (WITH PROPELLER NOISE)

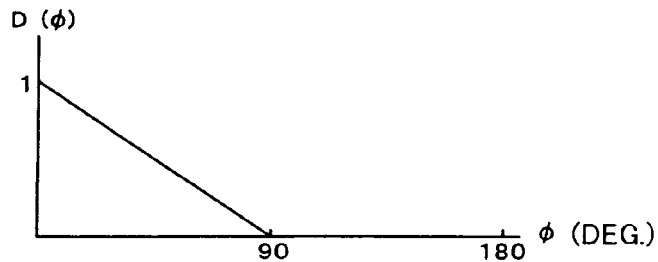
FIG.8
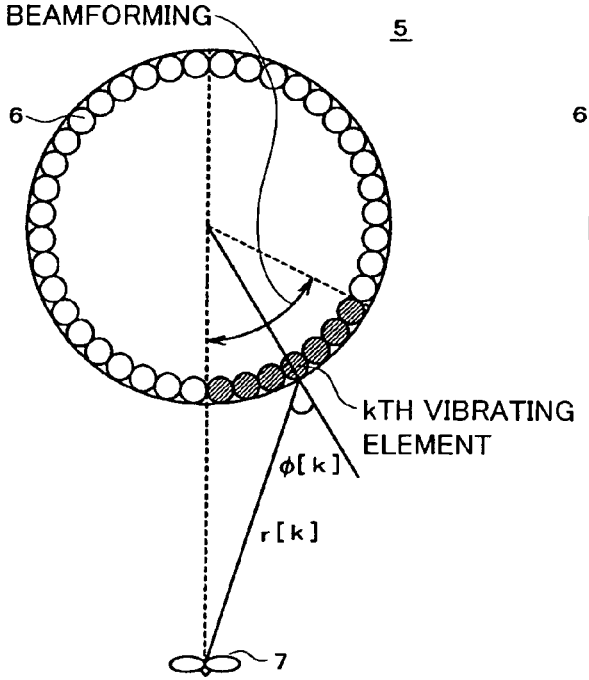 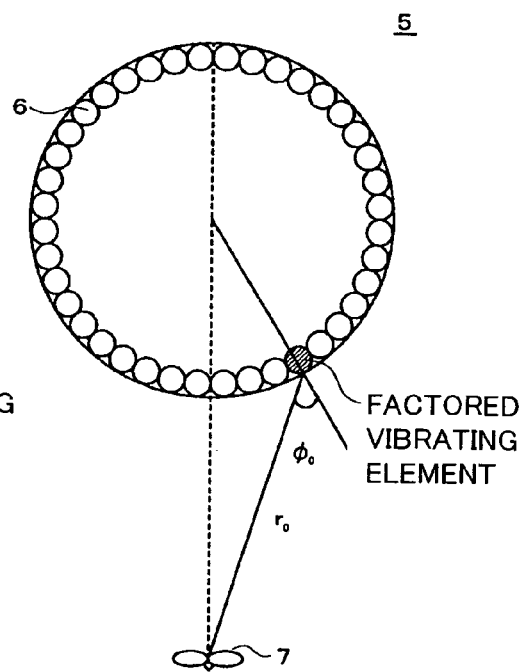
FIG.9A  FIG.9B

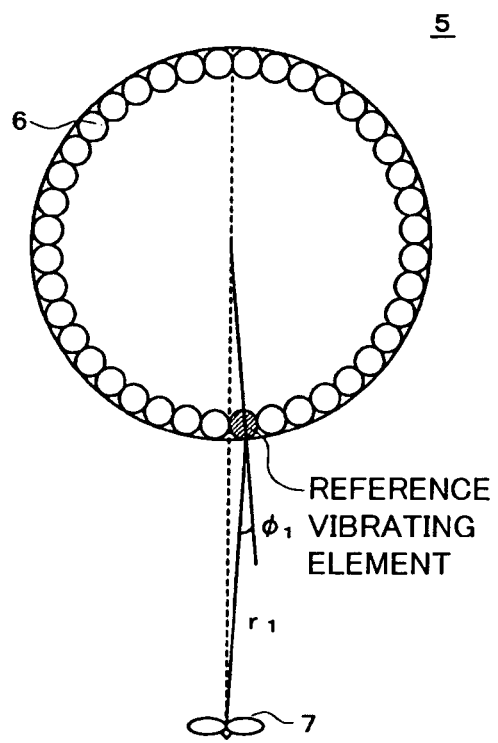 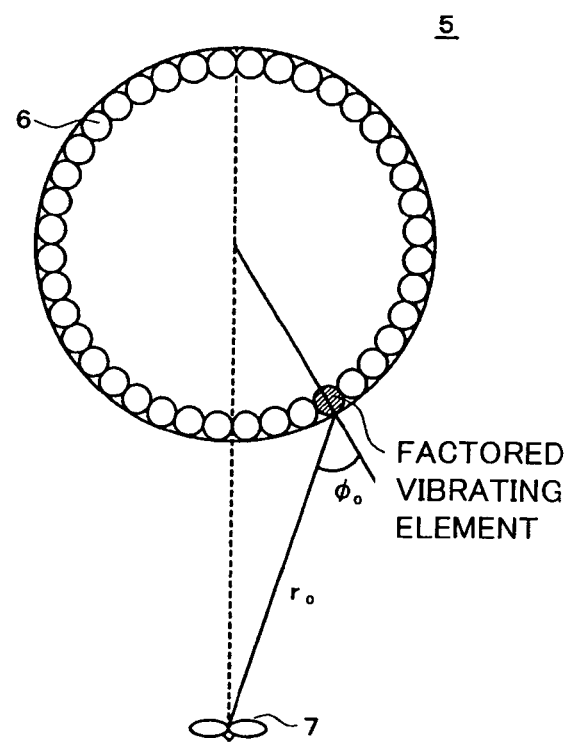
*FIG.15A*  *FIG.15B*

UNDERWATER SOUNDING APPARATUS

BACKGROUND OF THE INVENTION

1. Field of the Invention

The present invention relates to an underwater sounding apparatus capable of eliminating the influence of propeller noise.

2. Description of the Prior Art

FIG. 20 illustrates how an underwater sounding apparatus obtains information on an underwater situation, such as distribution of fish schools. Referring to FIG. 20, designated by the numeral 80 is an underwater sounding apparatus installed on a vessel 81, designated by the numeral 82 is an acoustic transducer unit of the underwater sounding apparatus 80, designated by the numeral 83 is a propeller of the vessel 81 and designated by the numeral 84 is a water surface. Also, designated by the letters Bt is a transmitting beam emitted from the transducer unit 82, designated by the letters Br is a receiving beam for receiving echo signals returned from underwater objects which reflect part of energy of the transmitting beam Bt and designated by the letter α is a tilt angle of the transmitting beam Bt.

The transmitting beam Bt is transmitted underwater simultaneously in all directions around the transducer unit 82, typically forming an umbrellalike beam pattern directed obliquely downward by as much as the tilt angle α. The receiving beam Br, on the other hand, is a rotating beam having specific directivity. The receiving beam Br is electronically steered around the transducer unit 82 by successively switching vibrating elements thereof. The underwater sounding apparatus 80 obtains information about fish schools and other underwater objects by processing and analyzing the echo signals received by the receiving beam Br.

Japanese Laid-open Patent Publication Nos. 2001-343450 and 202370 disclose methods of controlling the tilt angle of a transmitting beam formed by an acoustic transducer unit having a plurality of vibrating elements arranged in multiple rows and columns on a cylindrical outer surface of a transducer body as well as methods of forming a receiving beam. Also, Japanese Laid-open Patent Publication No. 2003-084060 discloses an electrical block diagram of a scanning sonar which is an example of the underwater sounding apparatus.

Typically, the transducer unit 82 transmits and receives ultrasonic sounding waves (acoustic waves) while the vessel 81 is moving so that sound waves produced by the revolving propeller 83 act as noise superimposed on the echo signals.

FIG. 21 is a diagram showing an example of false images (false echoes) 90–92 presented on a display unit of the underwater sounding apparatus 80 due to propeller noise when the tilt angle α of the transmitting beam Bt and the sounding range of the underwater sounding apparatus 80 are set to 0° and 400 m, respectively. Here, the false images refer to echoes presented on the display unit due to signals (e.g., propeller noise) other than true echo signals. As illustrated in FIG. 21, the vessel 81 is located at a screen center (sweep center) and the heading of the vessel 81 lies on a line connecting the sweep center (in head-up presentation).

In the example of FIG. 21, the false echo 90 painted in a darker shade is located behind the vessel 81 while the false echoes 91, 92 painted in a lighter shade lie on left and right sides of the vessel 81 slightly behind a line drawn athwartships. A reason why the false echoes 91, 92 occur obliquely rearward is presumably that left and right side lobes of the receiving beam Br lie approximately in a propeller noise direction when the receiving beam Br is oriented in the directions of these two false echoes 91, 92. The false echoes 90–92 overlying true echoes could obscure or totally hide away echo signals of real targets, such as fish schools.

Generally, it is difficult for a user to distinguish true echoes from the false echoes 91, 92 presented obliquely rearward. Thus, the underwater sounding apparatus 80 conventionally has a problem that its detection performance is deteriorated by such false echoes caused by the propeller noise. The influence of the propeller noise is, by its nature, more significant when the tilt angle α of the transmitting beam Bt is small, and when the distance between the transducer unit 82 and the propeller 83 is small (i.e., on smaller vessels).

An approach to the solution of the aforementioned propeller noise problem is disclosed in Japanese Laid-open Patent Publication No. 1991-017583, in which an underwater sounding apparatus has, in addition to an ordinary transducer unit directed vertically downward for target sounding, a hollow cylinder-shaped transducer unit surrounding the sounding transducer unit and dedicated exclusively to receiving propeller noise. According to this prior art approach, a propeller noise signal received by the dedicated transducer unit is delayed and its gain is controlled such that the received propeller noise signal matches in amplitude and timing (phase) with the propeller noise contained in echo signals received by the sounding transducer unit. Then, the propeller noise is canceled out by subtracting the delayed and gain-controlled propeller noise signal from the echo signals received by the sounding transducer unit.

The approach of Japanese Laid-open Patent Publication No. 1991-017583 requires the provision of the dedicated propeller noise receiving transducer unit surrounding the sounding transducer unit. When this approach is applied to an underwater sounding apparatus employing a plurality of vibrating elements arranged in multiple rows and columns on a cylindrical outer surface of a transducer body, for example, there arises a problem that the propeller noise receiving transducer unit intervenes in propagation paths of transmitting and receiving beams, making it impossible to detect underwater target information. In addition, the need for the provision of the dedicated propeller noise receiving transducer unit results in an overall cost increase due to an increase in the number of components.

SUMMARY OF THE INVENTION

In view of the foregoing, it is an object of the invention to provide an underwater sounding apparatus which can eliminate the influence of propeller noise without the need for an extra transducer unit dedicated exclusively to receiving the propeller noise.

In a first principal form of the invention, an underwater sounding apparatus includes a transducer unit having a plurality of vibrating elements for transmitting acoustic waves and receiving reflected echoes from which the underwater sounding apparatus derives received signals, and a noise suppressor for removing propeller noise, the noise suppressor including a reference signal generator, a noise compensating signal generator and a signal synthesizer. The reference signal generator outputs as a reference signal of the propeller noise a reference received signal which is the received signal derived from one of the vibrating elements having a principal acoustic axis oriented approximately in a propeller direction or a reference beam signal having a principal acoustic axis oriented in the propeller direction, the reference beam signal being produced from some of the multiple vibrating elements. The noise compensating signal generator outputs noise compensating signals obtained by adjusting the reference signal using adjustment factors individually defined for the received signals (or for receiving beam signals produced from some of the multiple received signals). The signal synthesizer removes the propeller noise from the individual received signals (or from the individual receiving beam signals) by synthesizing each of the received signals (or each of the receiving beam signals) with the pertinent one of the noise compensating signals.

Here, the expression "approximately in a propeller direction" implies not only a direction of the propeller location as viewed from the center of the transducer unit but also any direction which makes an angle of 90° or less with the direction of the propeller location as viewed from the center of the transducer unit.

In the underwater sounding apparatus thus structured, the reference signal is adjusted by the adjustment factors defined for the individual received signals (or for the individual receiving beam signals). The propeller noise contained in the adjusted reference signal has a value approximately equal to the value of the propeller noise contained in the received signals (or in the receiving beam signals). The propeller noise contained in the received signals (or in the receiving beam signals) is removed by synthesizing each of the received signals (or each of the receiving beam signals) with the adjusted reference signal.

Consequently, false echoes caused by the propeller noise would not show up on a display unit of the underwater sounding apparatus and this would serve to solve the aforementioned problem that false echoes overlying true echoes obscure or totally hide away echo signals of real targets, such as fish schools. This means that the invention helps prevent deterioration of detection performance of the apparatus due to the propeller noise.

As it is not necessary to provide a dedicated transducer unit for receiving the propeller noise, the underwater sounding apparatus of the invention does not impose a problem that the dedicated transducer unit interferes with transmission and reception of acoustic waves. In addition, as the number of components does not increase due to the provision of the dedicated propeller noise receiving transducer unit, it is possible to prevent an increase in the cost of the transducer unit.

In one feature of the invention, the reference signal generator outputs a plurality of reference signals, and the noise compensating signal generator outputs the noise compensating signals by adjusting one of the multiple reference signals whichever correlated strongly with the individual received signals (or the individual receiving beam signals).

This arrangement makes it possible to remove the propeller noise from the received signals (or the receiving beam signals) even when the influence of the propeller noise differs between the port side and the starboard side of a vessel or when the vessel has more than one propeller. Examples of the aforementioned reference signal strongly correlated with the received signal (or the receiving beam signal) are as follows. If a first reference signal is generated from received signals derived from the vibrating elements on the starboard side and a second reference signal is generated from received signals derived from the vibrating elements on the port side, for example, the first reference signal is used for removing the propeller noise from the received signals (or the receiving beam signal having a principal acoustic axis on the starboard side) derived from the starboard-side vibrating elements, and the second reference signal is used for removing the propeller noise from the received signals (or the receiving beam signal having a principal acoustic axis on the port side) derived from the port-side vibrating elements.

In a second principal form of the invention, an underwater sounding apparatus includes a transducer unit having a plurality of vibrating elements for transmitting acoustic waves and receiving reflected echoes from which the underwater sounding apparatus derives received signals, and a noise suppressor for removing propeller noise, the noise suppressor including a first reference signal generator, a second reference signal generator, a noise compensating signal generator and a signal synthesizer. The first reference signal generator outputs as a first reference signal of the propeller noise a first reference received signal which is the received signal derived from one of the vibrating elements having a principal acoustic axis oriented approximately in a propeller direction or a first reference beam signal having a principal acoustic axis oriented in the propeller direction, the first reference beam signal being produced from some of the multiple vibrating elements which together form a first aperture. The second reference signal generator outputs as a second reference signal of the propeller noise a second reference received signal which is the received signal derived from one of the vibrating elements having a principal acoustic axis oriented approximately in the propeller direction or a second reference beam signal having a principal acoustic axis oriented in the propeller direction, the second reference beam signal being produced from some of the multiple vibrating elements which together form a second aperture. The noise compensating signal generator outputs noise compensating signals obtained by adjusting one of the first and second reference signals whichever correlated strongly with the individual received signals (or individual receiving beam signals) using adjustment factors individually defined for the received signals (or for the receiving beam signals produced from some of the multiple received signals). The signal synthesizer removes the propeller noise from the individual received signals (or from the individual receiving beam signals) by synthesizing each of the received signals (or each of the receiving beam signals) with the pertinent one of the noise compensating signals.

Here, the expression "approximately in a (the) propeller direction" implies not only a direction of the propeller location as viewed from the center of the transducer unit but also any direction which makes an angle of 90° or less with the direction of the propeller location as viewed from the center of the transducer unit.

The underwater sounding apparatus thus structured offers the same advantageous effects as the underwater sounding apparatus of the aforementioned first principal form of the invention. In this underwater sounding apparatus, the noise compensating signals are produced by adjusting one of the first and second reference signals whichever correlated strongly with the individual received signals (or the individual receiving beam signals) using the adjustment factors individually defined for the received signals (or for the receiving beam signals). This arrangement makes it possible to remove the propeller noise from the received signals (or the receiving beam signals) even when the influence of the propeller noise differs between the port side and the starboard side of a vessel or when the vessel has more than one propeller. According to the aforementioned second principal form of the invention, not only the first and second reference signals but also a third reference signal, a fourth reference signal, and so forth may be used for producing the noise compensating signals.

In another feature of the invention, the adjustment factors used in the underwater sounding apparatuses of the aforementioned first and second principal forms of the invention have values calculated by using received data on the reference signal or the first and second reference signals and each of the received signals (or each of the receiving beam signals) obtained when the propeller is kept turning.

With this arrangement, the adjustment factors are calculated by using the received data in such a way that the propeller noise contained in the adjusted reference signal becomes approximately equal to the propeller noise contained in each of the received signals (or each of the receiving beam signals).

In another feature of the invention, the adjustment factors used in the underwater sounding apparatus of the aforementioned first and second principal forms of the invention have values calculated by using a positional relationship between the propeller and each vibrating element, directional characteristics of each vibrating element and the wavelength of the transmitted acoustic waves.

With this arrangement, it is possible to obtain the adjustment factors even when the underwater sounding apparatus is not actually installed on a vessel or when the vessel with the apparatus installed is not moving.

In another feature of the invention, each of the adjustment factors used in the underwater sounding apparatus of the aforementioned first and second principal forms of the invention is the ratio of the complex amplitude of one of the received signals (or one of the receiving beam signals) to the complex amplitude of pertinent one of the reference signals or the first or second reference signals obtained when the propeller noise is approximated by sine waves having the same frequency as the frequency of the transmitted acoustic waves.

This arrangement makes it possible to digitally calculate the adjustment factors from time-series data obtained by sampling the received signals and makes it unnecessary to provide an analog electronic circuit which requires fine adjustment. Consequently, it becomes possible to obtain the adjustment factors without the need for complicated fine adjustment.

In a third principal form of the invention, an underwater sounding apparatus includes a transducer unit having a plurality of vibrating elements for transmitting acoustic waves and receiving reflected echoes from which the underwater sounding apparatus derives received signals, and a noise suppressor for removing propeller noise, the noise suppressor including a first reference signal generator, a second reference signal generator, filters and a signal synthesizer. The first reference signal generator outputs as a first reference signal of the propeller noise a first reference received signal which is the received signal derived from one of the vibrating elements having a principal acoustic axis oriented approximately in a propeller direction or a first reference beam signal having a principal acoustic axis oriented in the propeller direction, the first reference beam signal being produced from some of the multiple vibrating elements which together form a first aperture. The second reference signal generator outputs as a second reference signal of the propeller noise a second reference received signal which is the received signal derived from one of the vibrating elements having a principal acoustic axis oriented approximately in the propeller direction or a second reference beam signal having a principal acoustic axis oriented in the propeller direction, the second reference beam signal being produced from some of the multiple vibrating elements which together form a second aperture. The filters provided individually for the received signals (or for receiving beams formed by the multiple received signals) outputs noise compensating signals obtained by processing one of the first and second reference signals whichever correlated strongly with the individual received signals (or receiving beam signals). The signal synthesizer removes the propeller noise from the individual received signals (or from the individual receiving beam signals) by synthesizing each of the received signals (or each of the receiving beam signals) with the pertinent one of the noise compensating signals.

Here, the expression "approximately in a (the) propeller direction" implies not only a direction of the propeller location as viewed from the center of the transducer unit but also any direction which makes an angle of 90° or less with the direction of the propeller location as viewed from the center of the transducer unit.

In the underwater sounding apparatus thus structured, the propeller noise contained in the noise compensating signal which is an output of each of the filters provided individually for the received signals (or for the receiving beam signals) for processing the first and second reference signals correlated strongly with the individual received signals (or receiving beam signals) has a value approximately equal to the value of the propeller noise contained in the received signals (or in the receiving beam signals). The propeller noise contained in the received signals (or in the receiving beam signals) is removed by synthesizing each of the received signals (or each of the receiving beam signals) with the pertinent one of the noise compensating signals.

Consequently, false echoes caused by the propeller noise would not show up on a display unit of the underwater sounding apparatus and this would serve to solve the aforementioned problem that false echoes overlying true echoes obscure or totally hide away echo signals of real targets, such as fish schools. This means that the invention helps prevent deterioration of detection performance of the apparatus due to the propeller noise. In addition, as the number of components does not increase due to the provision of the dedicated propeller noise receiving transducer unit, it is possible to prevent an increase in the cost of the transducer unit.

In this underwater sounding apparatus, the noise compensating signals are produced by the filters from the first and second reference signals whichever correlated strongly with the individual received signals (or the individual receiving beam signals). This arrangement makes it possible to remove the propeller noise from the received signals (or the receiving beam signals) even when the influence of the propeller noise differs between the port side and the starboard side of a vessel or when the vessel has more than one propeller. According to the aforementioned third principal form of the invention, not only the first and second reference signals but also a third reference signal, a fourth reference signal, and so forth may be used for producing the noise compensating signals.

In still another feature of the invention, the filters have filter coefficients of which values are calculated by using received data on the first and second reference signals and each of the received signals (or each of the receiving beam signals) obtained when the propeller is kept turning.

In the underwater sounding apparatus thus structured, the filter coefficients are calculated by using the received data in such a way that the propeller noise contained in the noise compensating signal output from each of the filters has a value approximately equal to the value of the propeller noise contained in the received signals (or in the receiving beam signals). This makes it possible to obtain optimum filter coefficients for removing the propeller noise.

As discussed in the foregoing, the noise compensating signals are obtained by adjusting the reference signals using adjustment factors in the underwater sounding apparatuses of the first and second principal forms of the invention whereas the noise compensating signals are obtained from the outputs of the filters into which the reference signals are input in the underwater sounding apparatus of the third principal form of the invention. What is true in any of these forms of the invention is that the noise compensating signals are derived from the adjusted reference signals.

Overall, it is not necessary to provide a dedicated transducer unit for receiving the propeller noise according to the present invention. Also, false echoes caused by the propeller noise would not show up on the display unit of the underwater sounding apparatus. This serves to solve the aforementioned problem that false echoes overlying true echoes obscure or totally hide away echo signals of real targets, such as fish schools and prevent deterioration of detection performance of the apparatus due to the propeller These and other objects, features and advantages of the invention will become more apparent upon reading the following detailed description in conjunction with the accompanying drawings.

BRIEF DESCRIPTION OF THE DRAWINGS

FIG. 2 is a block diagram of an underwater sounding apparatus according to a first embodiment of the invention;

FIG. 3 is a block diagram of a noise suppressor of the underwater sounding apparatus of the first embodiment;

FIGS. 4A and 4B are diagrams illustrating how echo signals received by individual vibrating elements are sampled;

FIGS. 5A, 5B and 5C are diagrams illustrating examples of transmitted and received signals;

FIG. 8 is a diagram showing directivity functions used in a second embodiment of the invention;

FIGS. 9A and 9B are diagrams illustrating a first combination of signals according to the second embodiment;

FIGS. 15A and 15B are diagrams illustrating a third combination of signals according to the second embodiment;

DETAILED DESCRIPTION OF THE PREFERRED EMBODIMENTS OF THE INVENTION

Specific embodiments of the present invention are now described with reference to the appended drawings.

First Embodiment

Referring first to FIGS. 1A–1B, 2, 3, 4 and 5A–5C, an underwater sounding apparatus 1 according to a first embodiment of the invention is described.

Figure 1A:
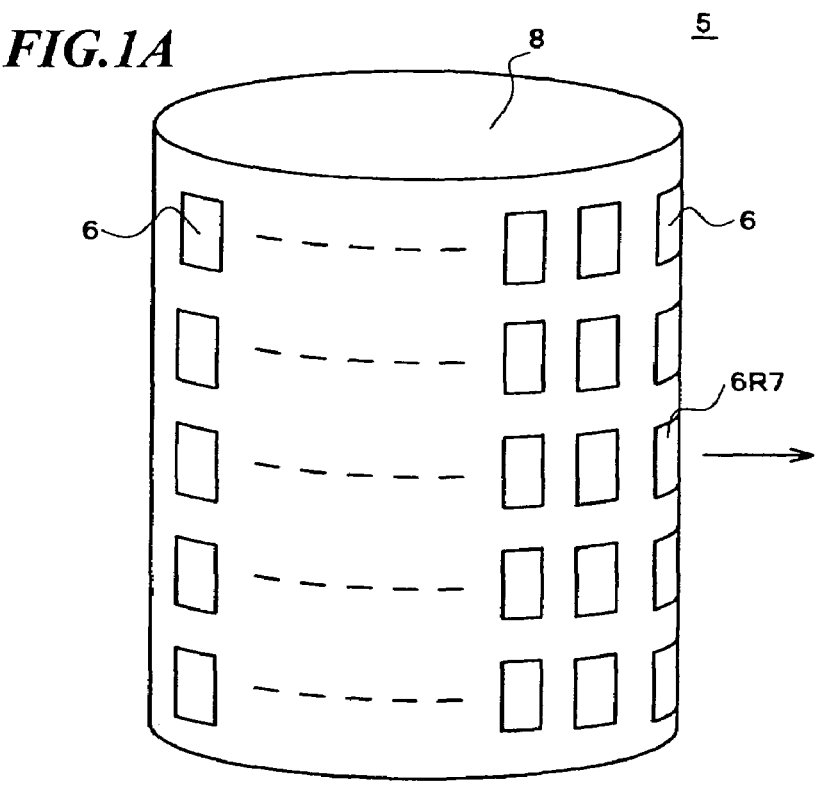
FIGS. 1A and 1B are a perspective view and a cross-sectional plan view of a transducer unit, respectively.

FIG. 1A is a perspective view of a transducer unit 5 of the underwater sounding apparatus 1 for transmitting and receiving ultrasonic sounding waves (acoustic waves). The transducer unit 5 has a transducer body 8 having a cylindrical outer surface on which a plurality of vibrating elements 6 oriented in specific directions are arranged in multiple rows and columns together forming a cylindrical array. In this embodiment, the vibrating elements 6 are arranged in 40 staves (vertical columns) by 5 rows. When sine-wave transmit signals are applied from a transmit driver 19 shown in a block diagram of FIG. 2 to the vibrating elements 6, the individual vibrating elements 6 oscillate, together forming a transmitting beam which is emitted into the body of water from the transducer unit 5. Acoustic waves emitted from the transducer unit 5 are partly reflected by underwater objects (targets) and the transducer unit 5 receives returning echo signals. When the transmitting beam tilt angle is set to 0° (horizontal directions), the individual transmit signals having the same amplitude and phase are applied to all the vibrating elements 6 of the transducer unit 5. In a case where the transmitting beam is to be emitted at a specific tilt angle (obliquely downward), on the other hand, the transmit signals having the same amplitude but successively delayed in phase from one row to next (from top to bottom of the transducer body 8) are applied to the vibrating elements 6.

Figure 1B:
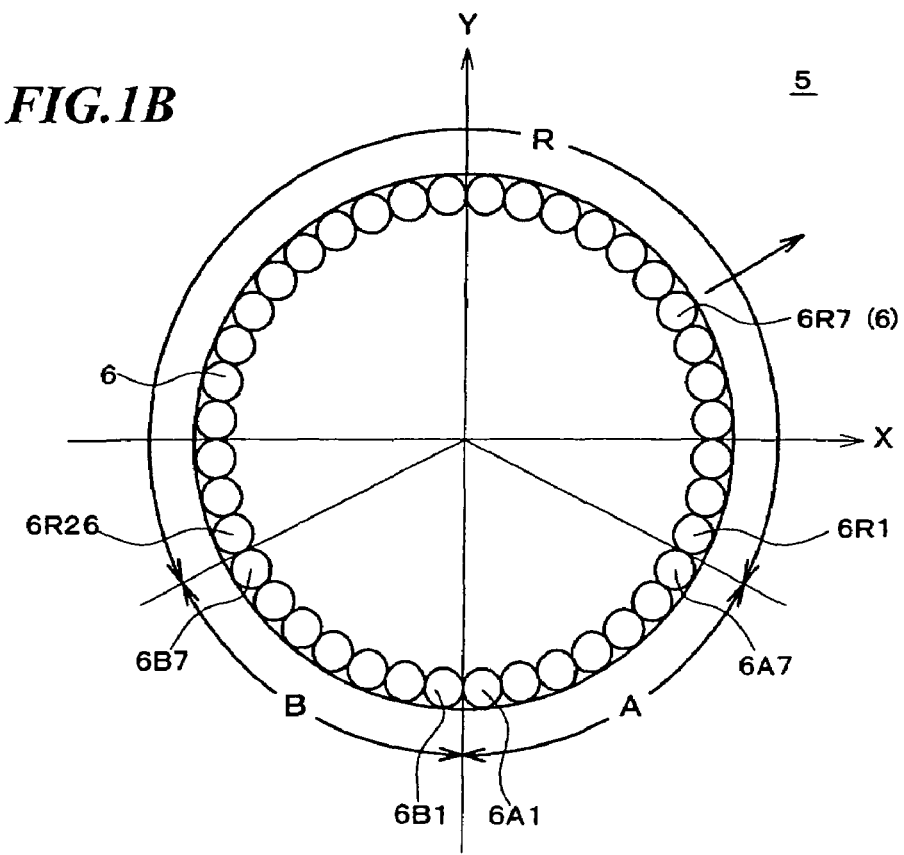

FIG. 1B is a cross-sectional plan view of the transducer unit 5 as it is cut by a horizontal plane at about the middle of the transducer height. Although the individual vibrating elements 6 are represented by small circles in FIG. 1B, the vibrating elements 6 actually have a noncircular shape. The origin of an x-y coordinate system used in FIG. 1B corresponds to a geometric center of the transducer unit 5 as viewed from top, a positive direction of the y-axis corresponding to the heading of a vessel on which the underwater sounding apparatus 1 is installed, and a negative direction of the y-axis corresponding to the direction of a propeller which is installed on the vessel's centerline. Also, negative and positive directions of the x-axis correspond to port and starboard sides of the vessel, respectively. As the transducer unit 5 is installed on the centerline of the vessel, the y-axis represents the vessel's centerline.

In FIG. 1B, the letters "A," "B" and "R" designate angular ranges of three groups of the vibrating elements 6, the "A" group including 7 vibrating elements 6A1–6A7 in each row, the "B" group including 7 vibrating elements 6B1–6B7 in each row, and the "R" group including 26 vibrating elements 6R1–6R26 in each row. An arrow extending radially outward from the vibrating element 6R7 as shown in FIG. 1B indicates a principal axial direction, that is, the direction of an acoustic axis in which the vibrating element 6R7 exhibits a peak of directivity for both outgoing and incoming acoustic signals. It can be seen from FIG. 1B that, although the principal axial direction of neither the vibrating element 6A1 nor 6B1 exactly matches the direction of the propeller, the principal axial directions of these vibrating elements 6A1, 6B1 may be regarded approximately as the direction of the propeller as the angle formed by the principal axial direction of each of the vibrating elements 6A1, 6B1 and the negative direction of the y-axis is not larger than 90°.

Referring now to the block diagram of FIG. 2, the configuration of the underwater sounding apparatus 1 is explained below. Acoustic signals received by the individual vibrating elements 6 are processed by multiple receiver channels each of which includes a first filter 11, an analog-to-digital (A/D) converter 12 and other circuit elements. It is to be noted that FIG. 2 illustrates the vibrating elements 6 of only the third-row cylindrical array together with the respective receiver channels, excluding the vibrating elements 6 and the receiver channels of the other rows for simplicity. The A/D converters 12 of the individual channels and the associated circuit elements are controlled by a control unit 20. Including a central processing unit (CPU), a digital signal processor (DSP) and a memory, the control unit 20 performs overall control of the individual circuit elements of the underwater sounding apparatus 1 by executing a program stored in the memory. The internal memory of the control unit 20 is used also as a storage area for various control data and a work area of the CPU for performing arithmetic operations.

The first filters 11 are bandpass filters which amplify the signals received by the individual vibrating elements 6 and allow echo signal components falling within a desired frequency range, or passband of the first filters 11, only. The passband of the first filters 11 is a specific frequency band centering on a transmitting frequency of the transducer unit 5, and frequency components of propeller noise received by the vibrating elements 6 and existing outside the passband of the first filters 11 are removed by the first filters 11. The propeller noise however has a wide frequency range and, thus, the frequency components of the propeller noise unremoved by the first filters 11 are removed by a later-described noise suppressor 3.

Each of the A/D converters 12 converts an output signal of the first filter 11 into a digital signal by sampling the output signal of the first filter 11 at successive points of a particular phase (hereinafter referred to as the first phase) of the internal transmit signal and at successive points of another phase (hereinafter referred to as the second phase) deviated from the first phase by 90°.

FIGS. 4A and 4B are diagrams specifically illustrating timing with which the echo signals contained in the received acoustic signals are sampled. In an example shown in FIG. 4A, each of the A/D converters 12 samples the echo signal at successive points of the first phase (shown by small circles "○") and at successive points of the second phase (shown by small crosses "x") every period T of the transmit signal. In an example shown in FIG. 4B, each of the A/D converters 12 samples the echo signal at successive points of the first phase (shown by small circles "○") and at successive points of the second phase (shown by small crosses "x") every one and half periods (1.5T) of the transmit signal. While the echo signals are sampled at the aforementioned successive points of the specified phases of the internal transmit signal as stated above, the phases at which the echo signals are sampled vary with the distance between the transducer unit 5 and underwater targets, although the difference between the first phase and the second phase remains always at 90°.

Here, expressing data sampled at a point of the first phase as "Q" and data sampled at a succeeding point of the second phase as "I", a set of data sampled at these points of the first and second phases is expressed by a complex number I+Qj. Since the phase difference between the first and second phases is 90°, I+Qj=(I$^2$+Q$^2$)$^{1/2}$exp(j2πft) according to Euler's theorem, where f is the transmitting frequency and t is sampling time. As it is possible to express a signal delayed from the aforementioned complex number I+Qj by a phase θ by multiplying the complex number I+Qj by exp(−jθ) and thereby facilitate numerical calculation, sampled time-series data are treated as complex numbers.

Each of the A/D converters 12 successively samples the received acoustic signal during a period from each transmission of the transmitting beam up to a point in time when the vibrating element 6 receives the echo signal returning from a maximum distance (e.g., 400 m) of a sounding range in use. FIGS. 5A, 5B and 5C are diagrams illustrating examples of transmitted and received signals, in which FIG. 5A shows the transmitted signal, FIG. 5B shows the received signal containing echo signals EC without any propeller noise, and FIG. 5C shows the received signal containing the echo signals EC and the propeller noise. Each of the A/D converters 12 delivers an output signal (or the time-series data obtained by sampling the received signal) to the noise suppressor 3. The time-series data from which the propeller noise components have been removed by the noise suppressor 3 (more strictly, the time-series data of which propeller noise components have been suppressed to a practically acceptable level) are sent to gain adjusters 13. The configuration and operation of the noise suppressor 3 will be later described in detail.

Each of the gain adjusters 13 regulates the amplitude of an output signal of the noise suppressor 3 such that the amplitude of an echo signal derived from the same underwater target (e.g., a fish school) is kept constant regardless of the distance between the transducer unit 5 and the underwater target. Specifically, the gain adjuster 13 regulates the amplitude of the echo signal of the detected underwater target according to the time elapsed after each transmission of the transmitting beam. More specifically, the gain adjuster 13 decreases amplification factor for short-range echo signals received within a short period of time after transmission and increases the amplification factor for long-range echo signals received after a lapse of a longer period of time after transmission. This gain adjustment operation is realized by multiplying the time-series data on the received signal of each receiver channel by the amplification factor which is varied according to the time elapsed after transmission of the transmitting beam.

A receiving beamformer 14 produces receiving beam signals from output signals of the gain adjusters 13 of the individual receiver channels using a beamforming technique of the prior art. First, the signals received by the individual vibrating elements 6 vertically arranged in a column oriented in each radial (horizontal) direction are phase-adjusted such that the signals derived from these vertically arranged vibrating elements 6 are matched in phase. The vertically phase-adjusted signals are added together to produce a signal for one radial direction. Signals for individual radial directions are produced in this fashion. Then, the signals obtained from a specific number of adjacent columns of the vibrating elements 6 oriented in successive radial directions are phase-adjusted such that the signals derived from all of these columns are matched in phase with the signal derived from the column at the center of the adjacent columns. The signals derived from the adjacent columns and horizontally phase-adjusted in this way are added together to produce a receiving beam signal having high directivity in each radial direction. While the number of vibrating elements 6 arranged in each row of the cylindrical array is illustrated as being equal to the number of receiving beam signals in FIG. 2, the number of receiving beam signals is typically made larger than the number of vibrating elements 6 arranged in each row.

Second filters 15 extract from output signals (i.e., the receiving beam signals) of the receiving beamformer 14 only those frequency components which are necessary, taking into consideration the Doppler effect produced by motion of the vessel. Since the frequency of the transmitted signal is f, a center frequency of echo signals contained in the receiving beam signal obtained from a fore-side channel is f+Δf, a center frequency of echo signals contained in the receiving beam signal obtained from an aft-side channel is f−Δf, and center frequencies of echo signals contained in the receiving beam signals obtained from the other channels fall within a range of f−Δf to f+Δf. The aforementioned control unit 20 calculates the center frequencies of the echo signals received from the individual radial directions based on the vessel's moving speed and sets properties of the individual second filters 15 in such a manner that only those signal components which fall within a specific frequency band in the vicinity of the center frequency of each echo signal are allowed to pass through the relevant second filter 15.

Amplitude sensors 16 detect the amplitude of an output signal of each second filter 15. The amplitude of the output signal of the second filter 15 is proportional to the degree of fish school concentration in each radial direction, for instance. An image processor 17 performs a specific image processing operation on amplitude data output from the amplitude sensors 16 and a display unit 18 displays fish school echoes according to the concentrations, directions and distances of detected fish schools.

The configuration of the noise suppressor 3 is now described with reference to FIG. 3. As previously mentioned, the output signals of the A/D converters 12 of the individual channels are fed into the noise suppressor 3, which removes (or substantially suppresses) the propeller noise components from the output signals of the A/D converters 12. Referring to FIG. 3, the noise suppressor 3 includes a pair of reference beam generators 31, 32. The output signals of the A/D converters 12 connected to the "A" group vibrating elements 6A1–6A7 are also delivered to the reference beam generator 31 while the output signals of the A/D converters 12 connected to the "B" group vibrating elements 6B1–6B7 are also delivered to the reference beam generator 32.

The reference beam generators 31 and 32 produce a pair of receiving beam signals by using the same beamforming technique as used the receiving beamformer 14 for producing the aforementioned receiving beam signals. More specifically, the reference beam generator 31 produces one of the receiving beam signals and the reference beam generator 32 produces the other from the signals received respectively by the "A" group vibrating elements 6A1–6A7 (together forming an aperture "A") and the "B" group vibrating elements 6B1–6B7 (together forming an aperture "B") and processed by the first filters 11 and the A/D converters 12 of the pertinent channels. These two receiving beam signals (hereinafter referred to as reference beam signals, or reference signals "A" and "B") have principal acoustic axes, or beam axes, oriented both in the direction of the propeller (not obliquely rearward). The reference signals "A" and "B" are receiving beam signals having high directivity with their principal acoustic axes oriented both in the direction of the propeller which is the source of the propeller noise. It is therefore possible to exactly calculate adjustment factors $C_L$, $C_R$ which will be later-discussed.

As shown in FIG. 3, the noise suppressor 3 further includes a plurality of noise processing circuits 33 corresponding to the individual receiver channels, each noise processing circuit 33 including a multiplexer 34 and an adjustment factor setter 35. Upon receiving the reference signals "A" and "B", the multiplexer 34 of each noise processing circuit 33 outputs the reference signal "A" or "B", whichever applicable, according to a control signal fed from the control unit 20. Whether the multiplexer 34 outputs the reference signal "A" or "B" is controlled individually in each noise processing circuit 33.

Taking into consideration the fact that the propeller is located on the centerline of the vessel in this embodiment as well as a direction of propagation of the propeller noise, the multiplexers 34 of the noise processing circuits 33 for processing the signals of the "A" group receiver channels and half of the "R" group receiver channels on the starboard side select the reference signal "A", whereas the multiplexers 34 of the noise processing circuits 33 for processing the signals of the "B" group receiver channels and half of the "R" group receiver channels on the port side select the reference signal "B". In short, the multiplexer 34 of each noise processing circuit 33 selects the reference signal "A" or "B" which is strongly correlated with the signal (time-series data) treated in each receiver channel.

While the multiplexer 34 is provided in each noise processing circuit 33 such that the signal of each receiver channel can be properly treated even when the distance and relative positions between the transducer unit 5 and the propeller vary, for example, in the illustrated example of the present embodiment, the multiplexers 34 become unnecessary if the reference signal "A" or "B" is made unchangeably applicable to the signal of each receiver channel. Also, if an additional circuit for selecting the receiver channel signal to be input into each of the reference beam generators 31, 32, the configuration of the noise suppressor 3 is further enhanced.

The reference signal "A" or "B" output from each multiplexer 34 is multiplied by one of the adjustment factors $C_L$, $C_R$ stored in the adjustment factor setters 35 by a signal multiplier 36 provided in each noise processing circuit 33. A signal obtained as a resultant product of this multiplication (hereinafter referred to as a noise compensating signal) in the noise processing circuit 33 is subtracted from the received signal by a signal synthesizer 37 of each receiver channel.

Having different values for the individual noise processing circuits 33, the aforementioned adjustment factors $C_L$, $C_R$ are complex numbers which make it possible to remove the propeller noise from the received signals of the relevant receiver channels by the subtracting operation explained above. For example, the adjustment factors $C_L$, $C_R$ have smaller values for the fore-side receiver channels, and larger values for the aft-side receiver channels. A register provided in each noise processing circuit 33 or the internal memory of the control unit 20, for example, is used as the adjustment factor setter 35.

Now, a method of calculating the adjustment factors $C_L$, $C_R$ is explained below. To prevent any echo signals from mixing into acoustic signals received by the individual vibrating elements 6, transmission of the ultrasonic sounding waves from the transducer unit 5 is interrupted with the propeller kept turning. Then, the control unit 20 of the underwater sounding apparatus 1 is set to adjustment factor calculation mode by using pertinent key(s) on an operator panel (not shown) of the apparatus 1. The underwater sounding apparatus 1 works as stated below in the adjustment factor calculation mode. While the vessel is running, the acoustic signals received by the individual receiver channels are sampled by the A/D converters 12 at successive points of the first and second phases shown in FIGS. 4A and 4B for a specific period of time (e.g., 2 seconds) to obtain complex number time-series data on the received signals and the reference signals "A" and "B".

Here, the number of the time-series data sampled during the aforementioned specific period of time is expressed as N, the time-series data obtained from the starboard-side receiver channels during the same period are expressed as R[k] (where k is any whole number taken from 0 to N−1; k=0 to N−1), the time-series data obtained from the port-side receiver channels during the same period are expressed as L[k] (k=0 to N−1), the time-series data on the reference signal "A" obtained during the same period are expressed as A[k] (k=0 to N−1), and the time-series data on the reference signal "B" obtained during the same period are expressed as B[k] (k=0 to N−1).

Given the aforementioned values, the adjustment factor $C_R$ for the starboard-side receiver channels and the adjustment factor $C_L$ for the port-side receiver channels are calculated by equations (1) and (2) below, respectively:

$$C_R = \Sigma(R[k] \cdot A^*[k])/\Sigma|A[k]|^2 \ (k=0 \text{ to } N-1) \quad (1)$$

$$C_L = \Sigma(L[k] \cdot B^*[k])/\Sigma|B[k]|^2 \ (k=0 \text{ to } N-1) \quad (2)$$

where $A^*[k]$ and $B^*[k]$ are complex conjugates of $A[k]$ and $B[k]$, respectively.

As the individual time-series data are treated as complex numbers here, it is possible to calculate the adjustment factors $C_L$, $C_R$ used for removing the propeller noise from equations (1) and (2) shown above. The adjustment factors $C_L$, $C_R$ for all of the receiver channels are calculated in this way and stored in the internal memory of the control unit 20. Each of the adjustment factors $C_L$, $C_R$ thus prepared is used as a coefficient for obtaining the aforementioned noise compensating signal in normal operation mode.

A specific meaning of the aforementioned equations (1) and (2) is now explained from a physical point of view. Here, the propeller noise is approximated by a sine wave having the same frequency as the transmitting frequency, and an assumption is made that the propeller noise picked up by each receiver channel contains a signal of that sine wave. A reason why this assumption can be made is that only those components of the propeller noise which fall within a specific frequency range (i.e., the passband of the first filters 11) centering on the frequency of the transmitted acoustic signal are allowed to pass through the first filters 11 and A/D-converted by the individual A/D converters 12. Since $|A[k]|^2 = A[k]^* \cdot A[k]$, the equations (1) and (2) shown above can be rewritten as equations (3) and (4) below, respectively:

$$C_R = \Sigma(R[k]/A[k])/N \ (k=0 \text{ to } N-1) \quad (3)$$

$$C_L = \Sigma(L[k]/B[k])/N \ (k=0 \text{ to } N-1) \quad (4)$$

It is recognized from above that each of the adjustment factors $C_L$, $C_R$ is proportional to the ratio of the complex amplitude of the received signal to the complex amplitude of each of the reference signals "A", "B". Each of the adjustment factors $C_L$, $C_R$ is obtained by calculating the mean of N number of complex amplitude ratios as shown above to increase exactness of the adjustment factors $C_L$, $C_R$ through averaging operation.

Each of the adjustment factors $C_L$, $C_R$ calculated by using the aforementioned equations (1) and (2) with transmission of the ultrasonic sounding waves interrupted and with the propeller kept turning is a relative value (more strictly a ratio of complex amplitude) of propeller noise contained in the received signal picked up by each receiver channel as compared to the propeller noise contained in the reference signal "A" or "B". The relative value of the propeller noise contained in the received signal picked up by each receiver channel compared to the propeller noise contained in the reference signal "A" or "B" remains unchanged regardless of whether the ultrasonic sounding waves are transmitted or not.

Therefore, it is possible to remove the propeller noise from the received signals of the individual receiver channels by combining the individual received signals with noise compensating signals (specifically, by subtracting the noise compensating signals from the individual received signals by the signal synthesizers 37) which are obtained by adjusting the reference signals "A", "B" (i.e., by multiplying the reference signals "A", "B" by the pertinent adjustment factors $C_L$, $C_R$ by the signal multipliers 36) using the adjustment factors $C_L$, $C_R$ for the individual receiver channels in the normal operation mode.

Each of the adjustment factors $C_L$, $C_R$ given as a complex number can be expressed as C exp(jθc). Therefore, the aforementioned process of adjusting the reference signals "A", "B" includes not only a method of multiplying each of the reference signals "A", "B" by a pertinent one of the adjustment factors $C_L$, $C_R$ but also a method of multiplying the amplitude of each of the reference signals "A", "B" by the absolute value C of a pertinent one of the adjustment factors $C_L$, $C_R$ and shifting each of the received signals or the reference signals "A", "B" by as much as a time period θc/2πf corresponding to an angular deviation θc of a pertinent one of the adjustment factors $C_L$, $C_R$.

Figure 7:
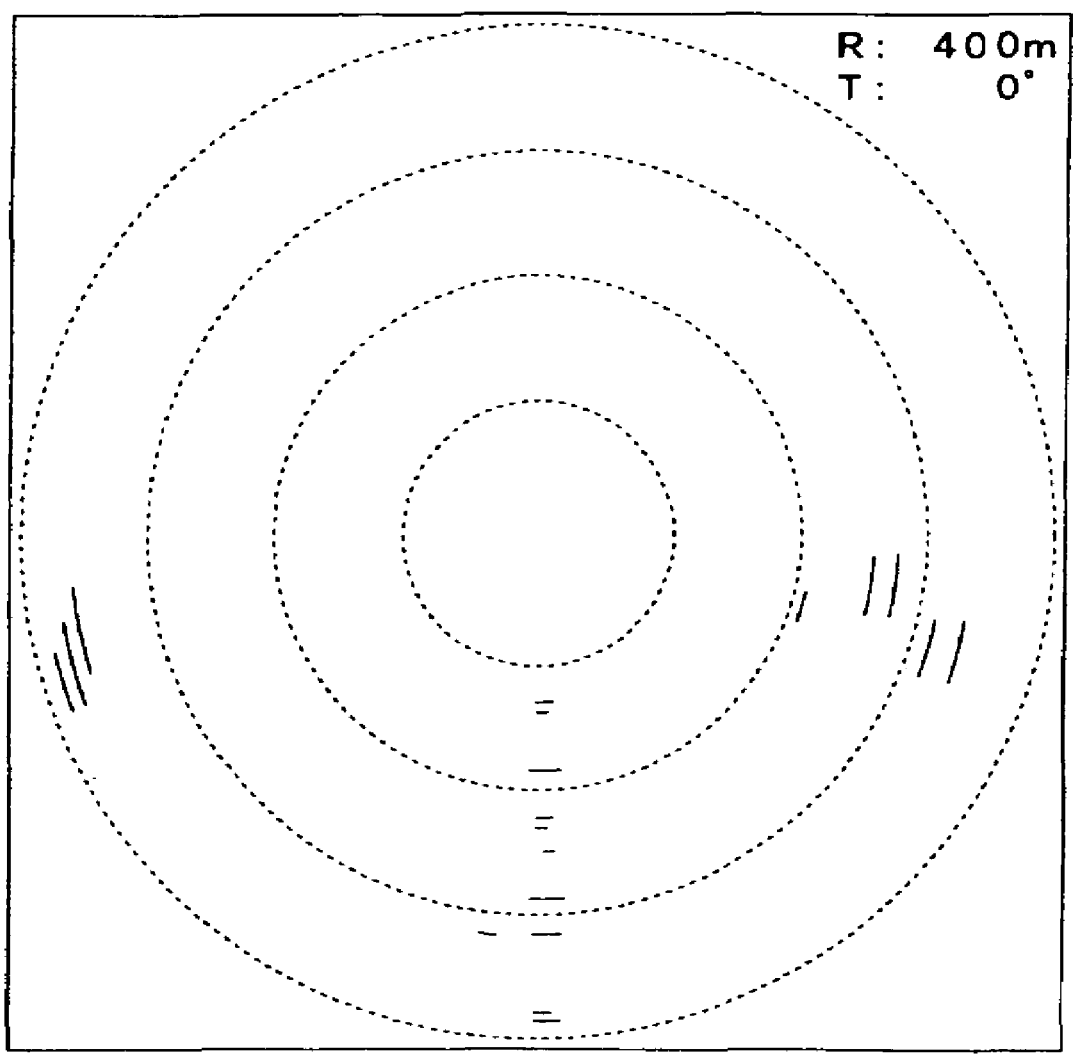
FIG. 7 is a diagram illustrating a situation in which false images due to propeller noise have almost disappeared.
Figure 21:
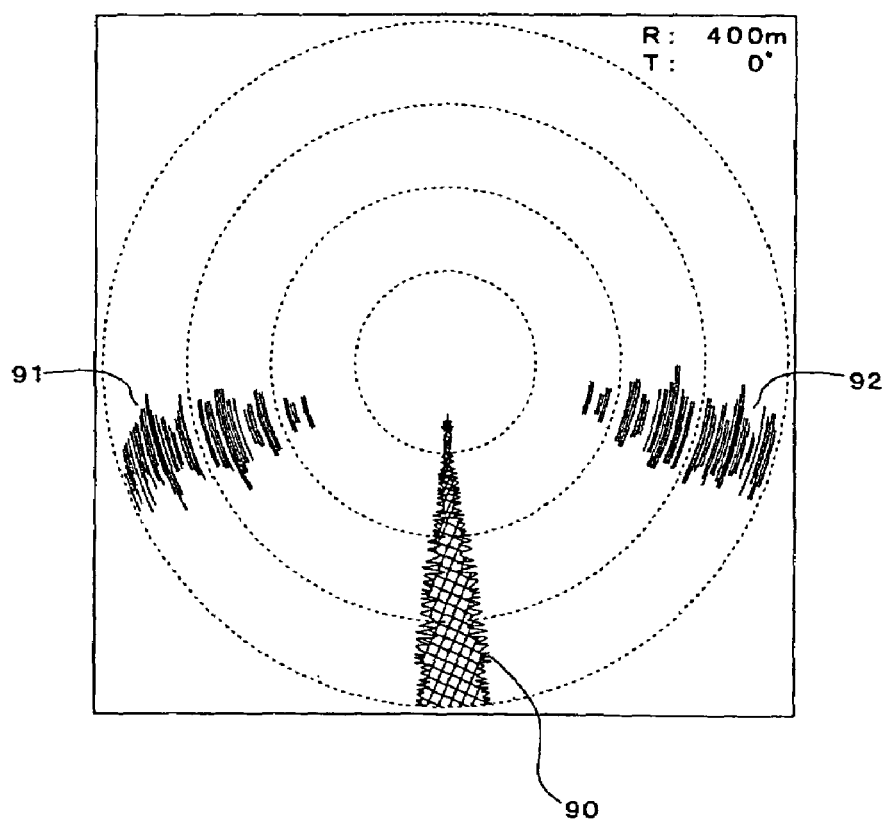
FIG. 21 is a diagram showing an example of false images produced by propeller noise.

Experiments performed by the inventors in the normal operation mode using the adjustment factors $C_L$, $C_R$ obtained by the aforementioned equations (1) and (2) have revealed that false echoes 90, 91, 92 (refer to FIG. 21) almost disappeared as shown in FIG. 7 when the underwater sounding apparatus 1 was used with the vessel running. The experiments also revealed that the false echoes 90, 91, 92 did not show up to any greater degree even when the vessel's moving speed was changed.

As the components of the propeller noise existing outside the passband of the first filters 11, or those components which are located away from the transmitting frequency f, are removed by the first filters 11 provided in a preceding stage of the A/D converters 12 beforehand, it is possible to correctly calculate the adjustment factors $C_L$, $C_R$ by using the aforementioned equations (1) and (2).

While transmission of the ultrasonic sounding waves is interrupted in the above-described process of calculating the adjustment factors, transmission need not be switched off if echo signals returned from fish schools and/or sea bottom are sufficiently small as compared to the magnitude of the propeller noise, or if output power of the transmitted ultrasonic sounding waves is extremely small.

In the first embodiment thus far described, the received signals picked up by the individual receiver channels are treated as signals from which the propeller noise is to be removed and the receiving beam signals having the principal acoustic axes oriented in the propeller direction additionally produced from the received signals obtained by a specified number of receiver channels are used as the reference signals "A", "B". Instead of this approach, the underwater sounding apparatus 1 may employ an arrangement in which the receiving beam signals obtained from the received signals picked up by the individual receiver channels are treated as signals from which the propeller noise is to be removed and the receiving beam signals having the principal acoustic axes oriented in the propeller direction additionally produced from the received signals obtained by a specified number of receiver channels are used as reference signals.

Also, the embodiment may be modified such that the received signals picked up by the individual receiver channels are treated as signals from which the propeller noise is to be removed and the received signals picked up by specific vibrating elements (e.g., the vibrating elements 6A1 and 6B1) having principal acoustic axes oriented approximately in the propeller direction are used as reference signals. The embodiment may also be modified such that the receiving beam signals obtained from the received signals picked up by the multiple receiver channels are treated as signals from which the propeller noise is to be removed and the received signals picked up by specific vibrating elements (e.g., the vibrating elements 6A1 and 6B1) having principal acoustic axes oriented approximately in the propeller direction are used as reference signals.

In a case where the receiving beam signals are treated as signals from which the propeller noise is to be removed, the receiving beamformer 14 of FIG. 2 should be provided in a preceding stage of the noise suppressor 3 so that the reference signals are adjusted by the adjustment factors $C_L$, $C_R$ for the respective receiving beam signals.

Figure 6A:
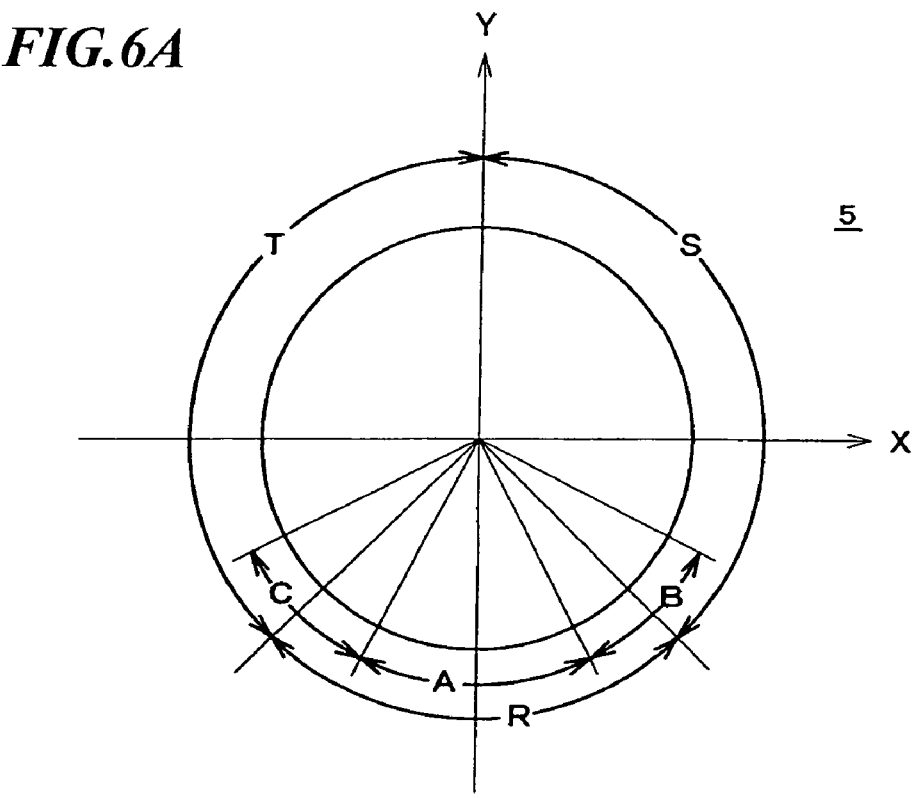
FIGS. 6A and 6B are diagrams illustrating how reference signals are produced in varied forms of the first embodiment.

While the propeller noise is removed from the received signals picked up by the port and starboard-side receiver channels using signals obtained by adjusting the reference signals "A" and "B" by the two adjustment factors $C_L$, $C_R$, respectively, the number of reference signals may be 1, or 3 or more. As an example, the underwater sounding apparatus 1 may be modified such that one reference signal (reference beam signal) is generated from the received signals obtained by the "A" and "B" group receiver channels of FIG. 2 and the propeller noise is removed from the received signals obtained by the port and starboard-side receiver channels by using this reference signal. As another example, the underwater sounding apparatus 1 may be modified such that the propeller noise is removed from received signals obtained by receiver channels of ranges "R", "S" and "T" by use of three reference signals generated from the received signals obtained by receiver channels of ranges "A", "B" and "C", respectively, as illustrated in FIG. 6A (in which circles representing the individual vibrating elements 6 are not shown).

Figure 6B:
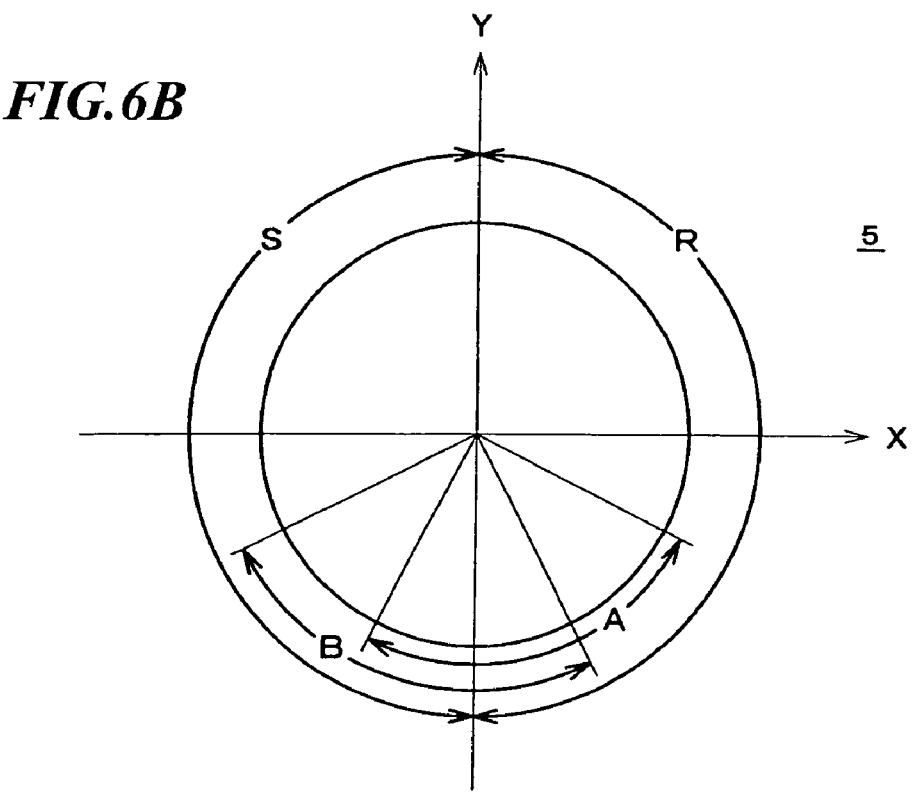

While none of the received signals obtained by the receiver channels used for producing the reference signal "A" overlap any of the received signals obtained by the receiver channels used for producing the reference signal "B" in the aforementioned embodiment, the underwater sounding apparatus 1 may be so modified as to generate reference signals from received signals obtained by ranges "A" and "B" of receiver channels containing one or more overlapping receiver channels as illustrated in FIG. 6B. In this modified form of the embodiment, two reference signals are generated from the received signals obtained by receiver channels of ranges "A" and "B" and the propeller noise is removed from received signals obtained by receiver channels of ranges "R" and "S" by using the two reference signals.

While the propeller noise is removed from the received signals obtained by all of the receiver channels in the aforementioned embodiment, the propeller noise need not necessarily be removed from the received signals derived from those vibrating elements 6 which are scarcely affected by the propeller noise, or from those vibrating elements 6 of which principal acoustic axes are oriented opposite to the propeller direction, for instance.

Furthermore, although the complex number time-series data are obtained by the A/D converters 12 for sampling the received signals at successive points of the first and second phases in the aforementioned embodiment, the underwater sounding apparatus 1 may be so modified as to use Hilbert transform devices or quadrature detectors in combination with A/D converters.

Moreover, while the foregoing discussion of the embodiment has illustrated a structure in which the transducer body 8 of the transducer unit 5 has a cylindrical surface, the invention is applicable to an underwater sounding apparatus employing a transducer unit of which transducer body has a spherical outer surface on which a large number of vibrating elements are arranged or employing a transducer unit of which transducer body has a cylindrical portion and a hemispherical portion formed at a bottom end of the cylindrical portion with a large number of vibrating elements arranged on an outer side surface of the cylindrical portion and on a surface of the hemispherical portion, for example.

Second Embodiment

Referring now to FIGS. 8 to 18 an underwater sounding apparatus 1 according to a second embodiment of the invention is described, in which elements identical or similar to those of the first embodiment are designated by the same reference numerals.

While the adjustment factors are calculated for the individual received signals from data on the reference signals "A", "B" and the received signals obtained with the propeller actually turned in the aforementioned first embodiment, adjustment factors are calculated from geometrical positions of a propeller 7 and the individual vibrating elements 6 on the assumption that a sine wave sound source emitting sine waves at the same frequency as the transmitting frequency of the transducer unit 5 is situated at the position of the propeller 7 (FIG. 9) in the second embodiment.

The underwater sounding apparatus 1 used in this embodiment is exactly the same in hardware configuration as shown in FIGS. 1A–1B, 2 and 3, except that a different method is used for calculating the adjustment factors. As in the foregoing discussion of the first embodiment, the propeller noise is approximated by a sine wave signal and each of the adjustment factors is given as the ratio of the complex amplitude of a received signal or a receiving beam signal (a signal from which the propeller noise is to be removed) to the complex amplitude of a reference signal in the following discussion of the second embodiment.

To distinctly distinguish the received signals obtained by the individual vibrating elements 6 (or by the individual receiver channels) from the receiving beam signals, the former are hereinafter referred to as "receiver channel signals" as necessary. Reference signals and signals from which the propeller noise is removed (that is, the receiver channel signals or receiving beam signals from which the propeller noise is removed by using noise compensating signals obtained by adjusting the reference signals based on the adjustment factors) which are discussed hereunder are the receiver channel signals or the receiving beam signals and may take four different combinations (first to fourth combinations).

Each of these combinations of receiver channel signals and receiving beam signals is explained in the following discussion, in which the wavelength of the transmitted acoustic waves is designated by λ and the directivity function of each vibrating element 6 is represented by D(φ) where φ is an angle from the normal to a radiating surface of the vibrating element 6. FIG. 8 shows an example of the directivity functions of the individual vibrating elements 6 used in the present embodiment. Here, the directivity function is a function obtained by normalizing the value of the function in the direction of the normal.

Now, the first combination of signals is described. In this combination of signals, the reference signals are the receiving beam signals and the signals from which the propeller noise is removed are the receiver channel signals. Receiver channels for which adjustment factors are calculated are hereinafter referred to as "factored" channels to distinguish these channels from the other channels. Likewise, the vibrating elements 6 connected to the "factored" channels are hereinafter referred to as "factored" vibrating elements to distinguish these vibrating elements from the other vibrating elements. Expressing the total number of the receiver channels which contribute to beamforming of the reference signal (reference beam signal) as K, each of these receiver channels is hereinafter referred to as the kth receiver channel (where k is any whole number taken from 0 to K−1; k=0 to K−1) and the vibrating element 6 connected to the kth receiver channel is hereinafter referred to as the kth vibrating element.

The control unit 20 (FIG. 2) calculates an adjustment factor C applied to each of the factored channels by equation (5) shown below. FIGS. 9A and 9B are diagrams showing a positional relationship between the propeller 7 and the vibrating elements 6, FIG. 9A showing the positional relationship between the propeller 7 and the vibrating elements 6 which contribute to beamforming of the reference signal (reference beam signal) and FIG. 9B showing the positional relationship between the propeller 7 and one of the factored vibrating elements. While the distance between the propeller 7 and the transducer unit 5 is shown as being approximately equal to the diameter of the transducer unit 5 in FIGS. 9A and 9B, the former is sufficiently larger than the latter in actuality.

$$C = \frac{D(\phi_0) \cdot \exp\left[-j2\pi \frac{r_0}{\lambda}\right]}{\sum_{k=0}^{K-1} W[k] \cdot D(\phi[k]) \cdot \exp\left[j\left\{\theta[k] - 2\pi \frac{r[k]}{\lambda}\right\}\right]} \quad (5)$$

where $r_0$: the distance between the propeller 7 and each factored vibrating element;
$\phi_0$: the angle formed by a straight line drawn between the propeller 7 and each factored vibrating element and the normal to the radiating surface thereof;
r[k]: the distance between the propeller 7 and the kth vibrating element;
φ[k]: the angle formed by a straight line drawn between the propeller 7 and the kth vibrating element and the normal to the radiating surface thereof;
W[k]: weight by which the received signal derived from the kth vibrating element is multiplied in the beamforming of the reference signal; and θ[k]: the amount of phase shift applied to the received signal derived from the kth vibrating element in the beamforming of the reference signal.

In short, equation (5) above calculates the adjustment factor C from the positional relationship between the propeller 7 and each vibrating element 6, the directional characteristics of each receiver channel and the wavelength of transmitted signal (acoustic waves). Here, the denominator of the right side of equation (5) is the complex amplitude of the reference signal obtained when the sine wave sound source emitting sine waves at the same frequency as the transmitting frequency is situated at the position of the propeller 7, and the numerator of the right side of equation (5) is the complex amplitude of the received signal obtained by the factored channel under the same conditions.

Figure 10A:
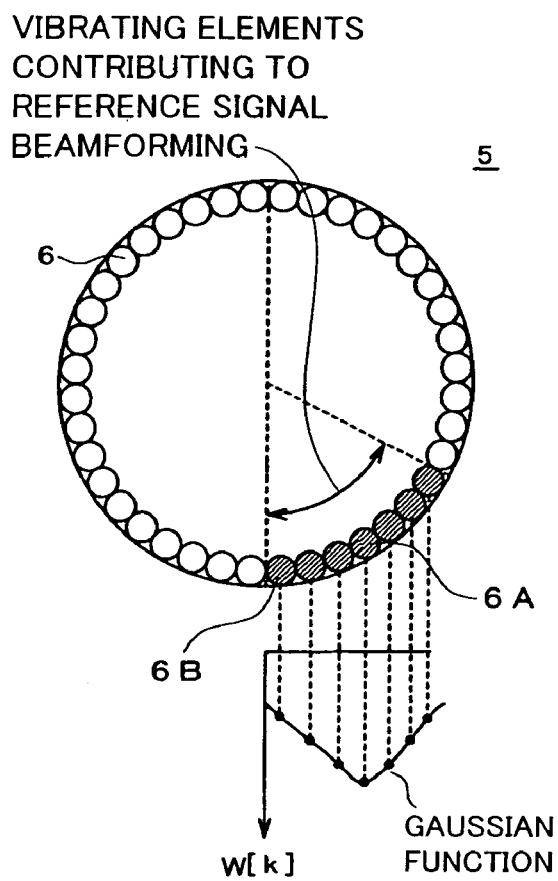
FIGS. 10A and 10B are diagrams illustrating the first combination of signals according to the second embodiment.
Figure 10B:
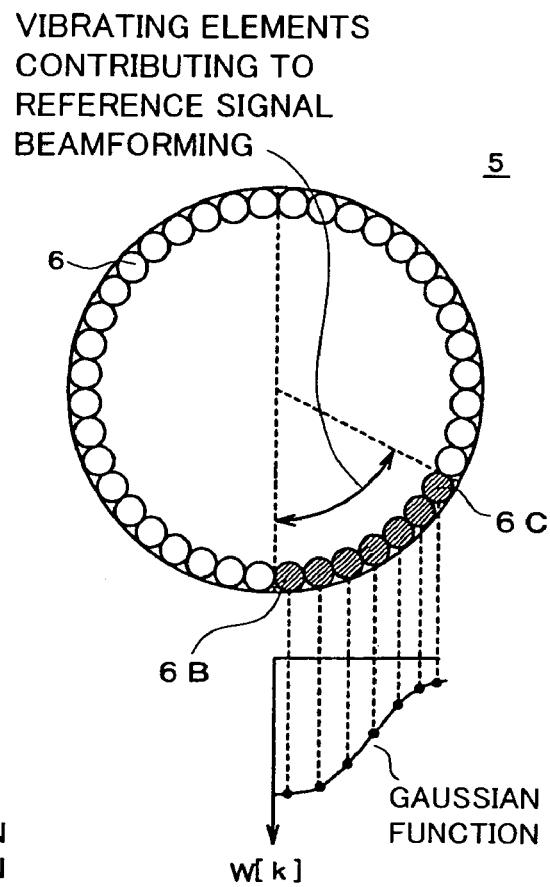

The aforementioned weight W[k] is a parameter for obtaining optimum reference signals. To suppress side lobes, weights W[k] having larger values should be given to vibrating elements 6A located at and in the vicinity of the aperture center of each reference beam and weights W[k] having smaller values should be given to vibrating elements 6B located closer to both ends of the aperture of each reference beam as shown in FIG. 10A. Also, to receive the propeller noise with a high signal-to-noise (S/N) ratio, it is preferable to give a weight W[k] having a large value to each vibrating element 6B of which principal acoustic axis matches the propeller direction and to give weights W[k] having smaller values to vibrating elements 6C of which principal acoustic axes form large angles with the propeller direction as shown in FIG. 10B. The values of W[k] can be determined by using a Gaussian function having an appropriate width as shown in FIGS. 10A and 10B.

A conventionally known phased-sum method is used in beamforming operation for generating the reference signals. According to this method, the amount of phase shift θ(k) is determined in such a way that the phase of the received signal at the position of each vibrating element 6 matches the phase of the received signal on an imaginary flat plane. Given the distance d[k] between this imaginary flat plane and the kth vibrating element, the amount of phase shift θ[k] is expressed as −2πd[k]/λ (refer to FIG. 11).

Figure 11:
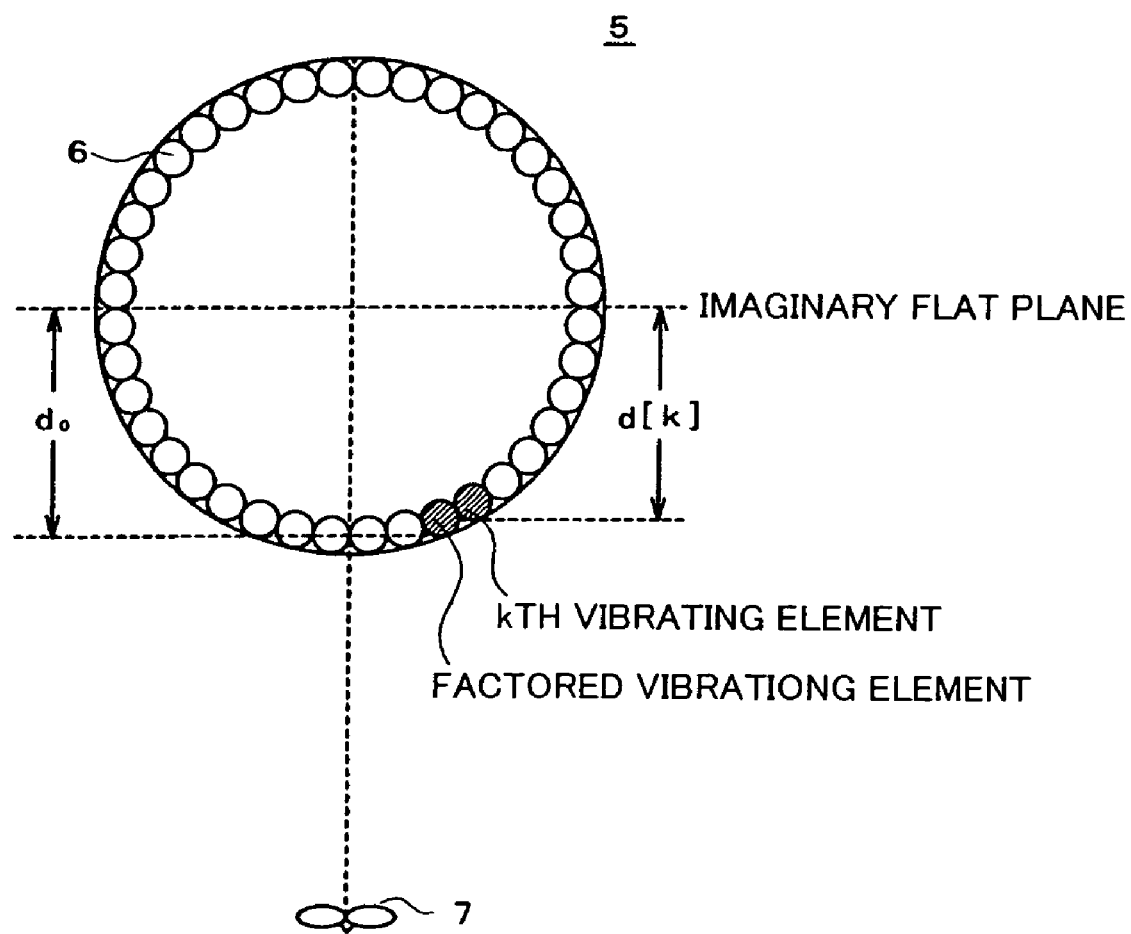
FIG. 11 is a diagram illustrating the first combination of signals according to the second embodiment.
Figures 12A, 12B:
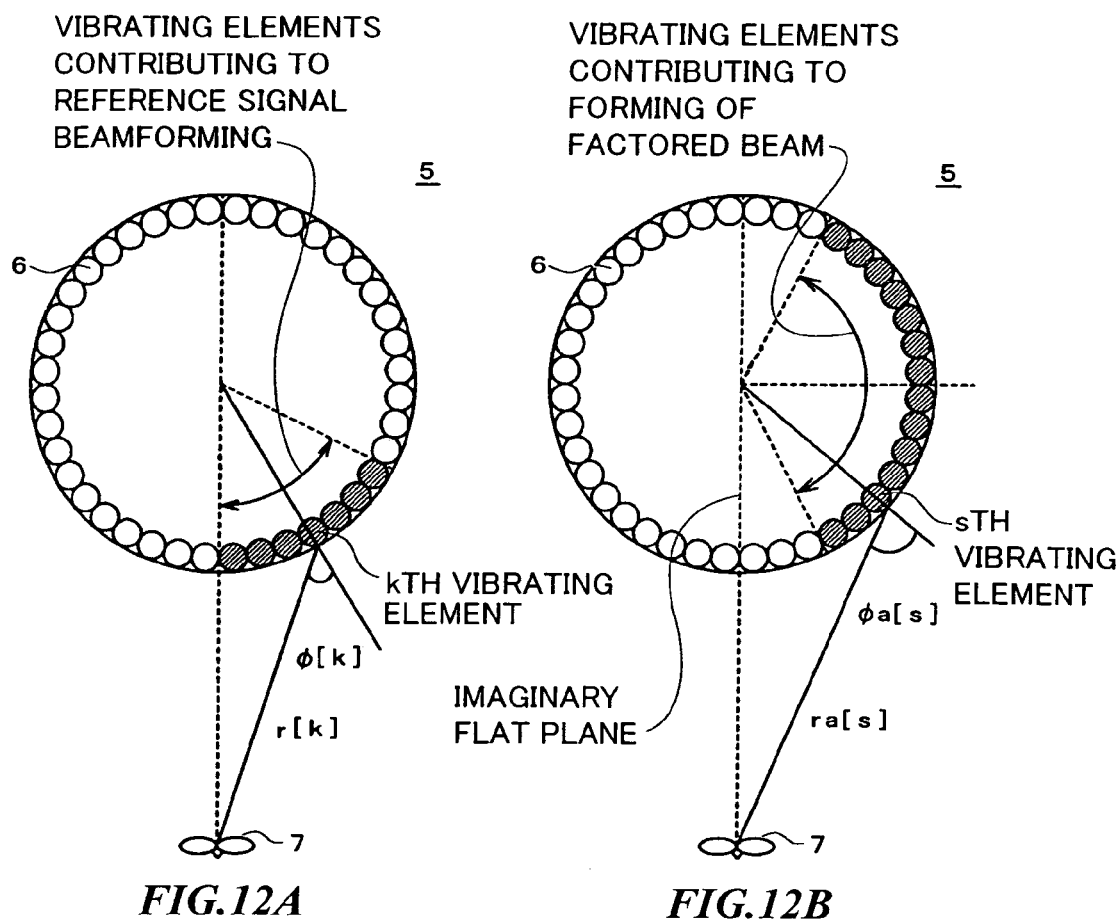
FIGS. 12A and 12B are diagrams illustrating a second combination of signals according to the second embodiment.

If the distance between the transducer unit 5 and the propeller 7 is large, an acoustic wave incident upon each vibrating element 6 from the sine wave sound source can be regarded as a plane wave. Therefore, the adjustment factor C can be calculated relatively easily by using equation (6) below which is an approximated expression of equation (5):

$$C = \frac{D(\phi_0) \cdot \exp\left[+j2\pi \frac{d_0}{\lambda}\right]}{\sum_{k=0}^{K-1} W[k] \cdot D(\phi[k])} \quad (6)$$

where $d_0$ is the distance between the aforementioned imaginary flat plane and the factored vibrating element (refer to FIG. 11).

The adjustment factors for the receiver channel signals derived from the other vibrating elements 6 disposed on a right half of the transducer unit 5 (FIG. 11) are calculated in a similar way. Since the individual vibrating elements 6 are arranged at regular intervals on the surface of the transducer unit 5, the adjustment factors for the receiver channel signals derived from the vibrating elements 6 disposed on a left half of the transducer unit 5 have the same values as the vibrating elements 6 disposed at symmetric positions on the right half of the transducer unit 5. As can be seen from the directivity functions shown in FIG. 8, the adjustment factor for the receiver channel signal derived from a particular vibrating element 6 is 0 if the angle formed by the straight line drawn between the propeller 7 and the vibrating element 6 and the normal to the radiating surface of the vibrating element 6 is equal to or larger than 90°. This means that the propeller noise is not removed from the receiver channel signals derived from such vibrating elements 6.

Next, the second combination of signals is described. In this combination of signals, not only the reference signals but also the signals from which the propeller noise is removed are the receiving beam signals. Here, receiving beam signals for which adjustment factors are calculated are hereinafter referred to as "factored" beams to distinguish these receiving beam signals from the other receiving beam signals.

Expressing the total number of the receiver channels which contribute to beamforming of the factored beams as S, each of these receiver channels is hereinafter referred to as the sth receiver channel (where s is any whole number taken from 0 to S−1; s=0 to S−1) and the vibrating element 6 connected to the sth receiver channel is hereinafter referred to as the sth vibrating element. The control unit 20 calculates an adjustment factor C applied to each of the factored beams by equation (7) shown below (refer to FIGS. 12A and 12B):

$$C = \frac{\sum_{s=0}^{S-1} Wa[s] \cdot D(\phi a[s]) \cdot \exp\left[j\left\{\theta a[s] - 2\pi \frac{ra[s]}{\lambda}\right\}\right]}{\sum_{k=0}^{K-1} W[k] \cdot D(\phi[k]) \cdot \exp\left[j\left\{\theta[k] - 2\pi \frac{r[k]}{\lambda}\right\}\right]} \quad (7)$$

where ra[s]: the distance between the propeller 7 and the sth vibrating element;

φa[s]: the angle formed by a straight line drawn between the propeller 7 and the sth vibrating element and the normal to the radiating surface thereof;

Wa[s]: weight by which the received signal derived from the sth vibrating element is multiplied in the beamforming of the factored beam;

θa[s]: the amount of phase shift applied to the received signal derived from the sth vibrating element in the beamforming of the factored beam;

r[k]: the distance between the propeller 7 and the kth vibrating element;

φ[k]: the angle formed by a straight line drawn between the propeller 7 and the kth vibrating element and the normal to the radiating surface thereof;

W[k]: weight by which the received signal derived from the kth vibrating element is multiplied in the beamforming of the reference signal; and θ[k]: the amount of phase shift applied to the received signal derived from the kth vibrating element in the beamforming of the reference signal.

Here, the denominator of the right side of equation (7) is the complex amplitude of the reference signal obtained when the sine wave sound source emitting sine waves at the same frequency as the transmitting frequency is situated at the position of the propeller 7, and the numerator of the right side of equation (7) is the complex amplitude of the factored beam produced under the same conditions.

Figure 13:
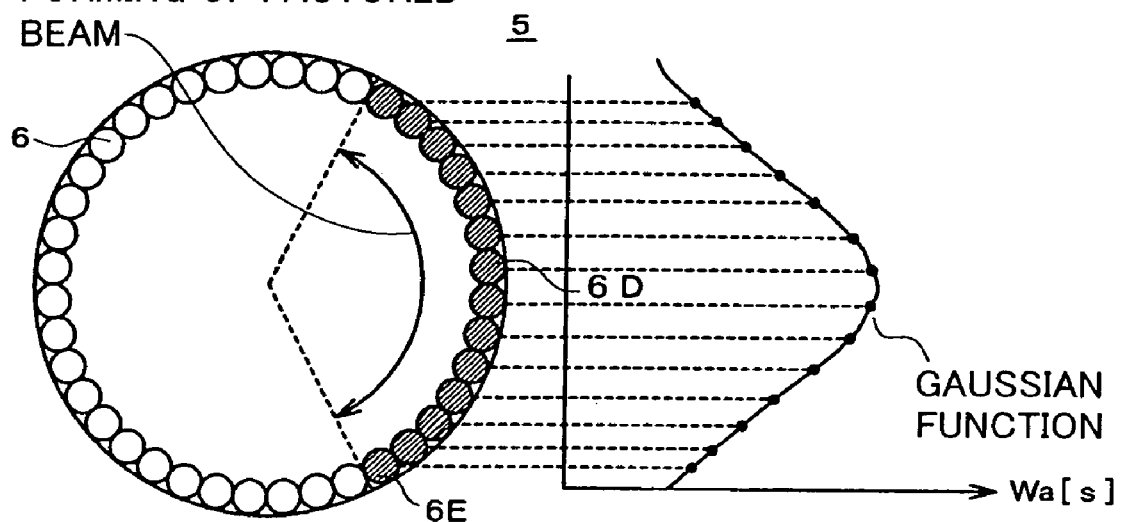
FIG. 13 is a diagram illustrating the second combination of signals according to the second embodiment.

The aforementioned weight Wa[s] is a parameter for suppressing side lobes. To suppress the side lobes, weights Wa[s] having larger values should be given to vibrating elements 6D located at and in the vicinity of the aperture center of each reference beam and weights Wa[s] having smaller values should be given to vibrating elements 6E located closer to both ends of the aperture of each reference beam as shown in FIG. 13. The values of Wa[s] can be determined by using a Gaussian function having an appropriate width as shown in FIG. 13. An imaginary flat plane used for determining the amount of phase shift θa[s] is a plane perpendicular to a line joining the center of the aperture formed by the vibrating elements 6 contributing to forming the factored beams to the center of the transducer unit 5 (refer to FIG. 12B).

Figure 14:
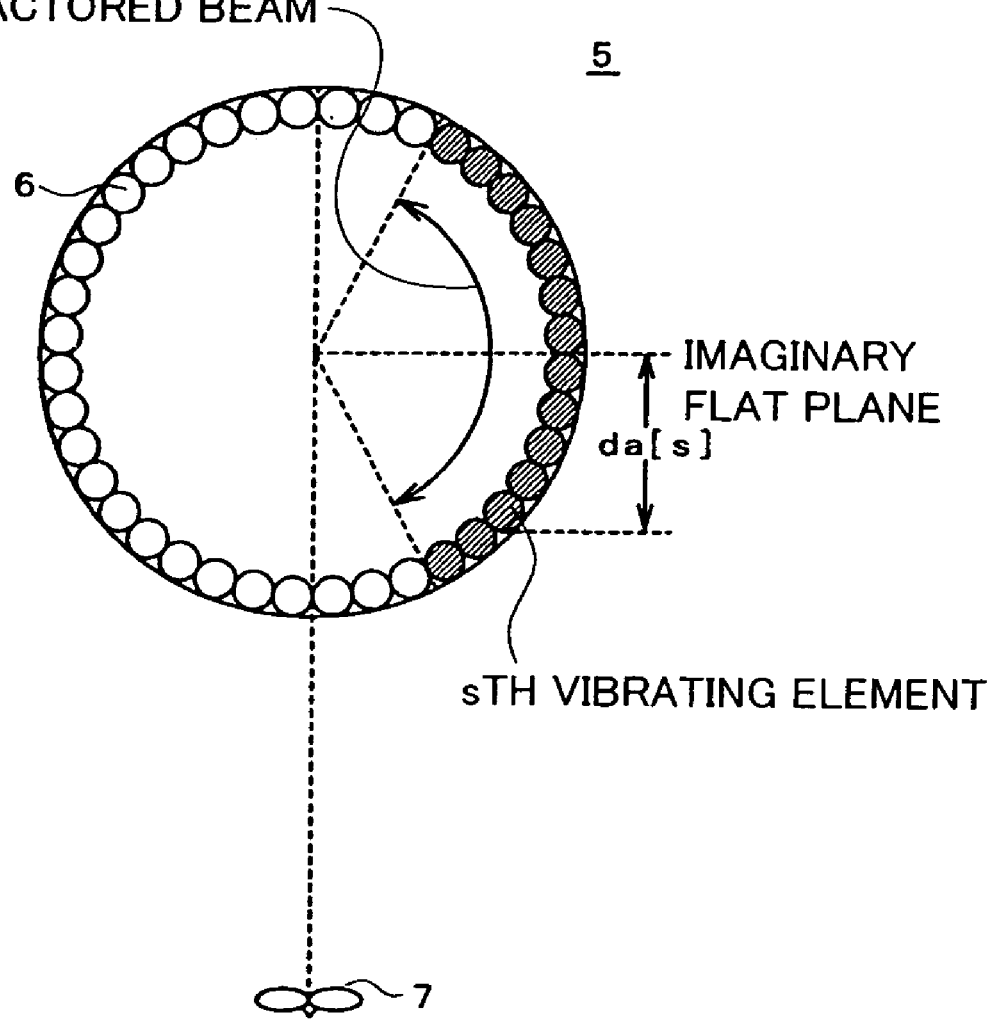
FIG. 14 is a diagram illustrating the second combination of signals according to the second embodiment.

If the distance between the transducer unit 5 and the propeller 7 is large, an acoustic wave incident upon each vibrating element 6 from the sine wave sound source can be regarded as a plane wave. Therefore, the adjustment factor C can be calculated relatively easily by using equation (8) below which is an approximated expression of equation (7):

$$C = \frac{\sum_{s=0}^{S-1} Wa[s] \cdot D(\phi a[s]) \cdot \exp\left[j\left\{\theta a[s] + 2\pi \frac{da[s]}{\lambda}\right\}\right]}{\sum_{k=0}^{K-1} W[k] \cdot D(\phi[k])} \quad (8)$$

where da[s] is the distance between the aforementioned imaginary flat plane used for forming the reference signal and the sth vibrating element (refer to FIG. 14).

The third combination of signals is now described. In this combination of signals, not only the reference signals but also the signals from which the propeller noise is removed are the receiver channel signals. Receiver channels used for generating the reference signals are hereinafter referred to as reference channels and the vibrating elements 6 connected to the reference channels are hereinafter referred to as reference vibrating elements. The control unit 20 calculates an adjustment factor C applied to each of the reference channels by equation (9) shown below (refer to FIGS. 15A and 15B), in which the denominator of the right side of equation (9) is the complex amplitude of the reference signal obtained when the sine wave sound source emitting sine waves at the same frequency as the transmitting frequency is situated at the position of the propeller 7, and the numerator of the right side of equation (9) is the complex amplitude of the received signal obtained by the factored channel under the same conditions:

$$C = \frac{D(\phi_0)}{D(\phi_1)} \cdot \exp\left[-j2\pi \frac{(r_0 - r_1)}{\lambda}\right] \quad (9)$$

where $r_0$: the distance between the propeller 7 and each factored vibrating element;

$\phi_0$: the angle formed by a straight line drawn between the propeller 7 and each factored vibrating element and the normal to the radiating surface thereof;

$r_1$: the distance between the propeller 7 and each reference vibrating element; and $\phi_1$: the angle formed by a straight line drawn between the propeller 7 and each reference vibrating element and the normal to the radiating surface thereof.

Figure 16:
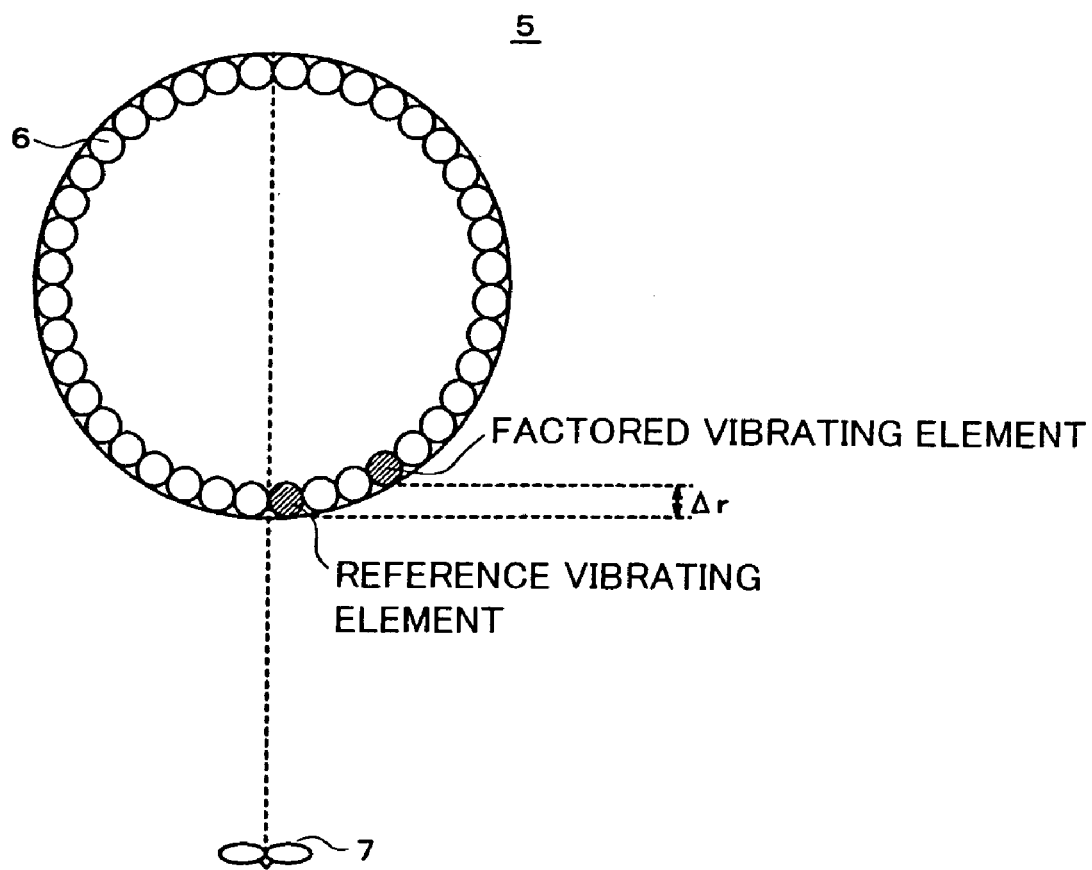
FIG. 16 is a diagram illustrating the third combination of signals according to the second embodiment.
Figures 17A, 17B:
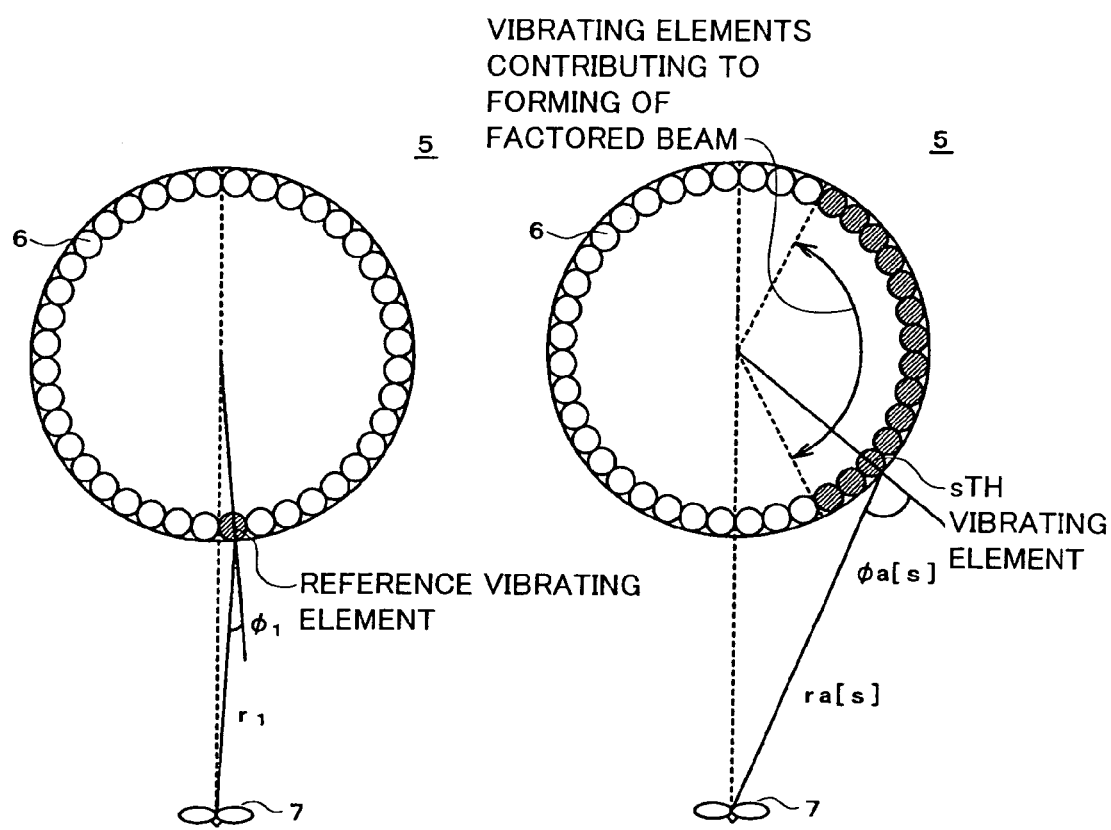
FIGS. 17A and 17B are diagrams illustrating a fourth combination of signals according to the second embodiment.

If the distance between the transducer unit 5 and the propeller 7 is large, an acoustic wave incident upon each vibrating element 6 from the sine wave sound source can be regarded as a plane wave. Therefore, the adjustment factor C can be calculated relatively easily by using equation (10) below which is an approximated expression of equation (9):

$$C = \frac{D(\phi_0)}{D(\phi_1)} \cdot \exp\left[-j2\pi\frac{\Delta r}{\lambda}\right] \quad (10)$$

where $\Delta r$ is the distance between the reference vibrating element and the factored vibrating element as measured along the propeller direction (refer to FIG. 16).

Finally, the fourth combination of signals is described. In this combination of signals, the reference signals are the receiver channel signals and the signals from which the propeller noise is removed are the receiving beam signals. The control unit 20 calculates an adjustment factor C applied to each of the factored channels by equation (11) shown below (refer to FIGS. 17A and 17B), in which the denominator of the right side of equation (11) is the complex amplitude of the reference signal obtained when the sine wave sound source emitting sine waves at the same frequency as the transmitting frequency is situated at the position of the propeller 7, and the numerator of the right side of equation (11) is the complex amplitude of the factored beam obtained under the same conditions:

$$C = \frac{\sum_{s=0}^{S-1} Wa[s] \cdot D(\phi a[s]) \cdot \exp\left[j\left\{\theta a[s] - 2\pi\frac{ra[s]}{\lambda}\right\}\right]}{D(\phi_1) \cdot \exp\left[-j2\pi\frac{r_1}{\lambda}\right]} \quad (11)$$

where ra[s]: the distance between the propeller 7 and the sth vibrating element;

φa[s]: the angle formed by a straight line drawn between the propeller 7 and the sth vibrating element and the normal to the radiating surface thereof;

Wa[s]: weight by which the received signal derived from the sth vibrating element is multiplied in the beamforming of the factored beam;

θa[s]: the amount of phase shift applied to the received signal derived from the sth vibrating element in the beamforming of the factored beam;

$r_1$: the distance between the propeller 7 and each reference vibrating element; and $\phi_1$: the angle formed by a straight line drawn between the propeller 7 and each reference vibrating element and the normal to the radiating surface thereof.

Figure 18:
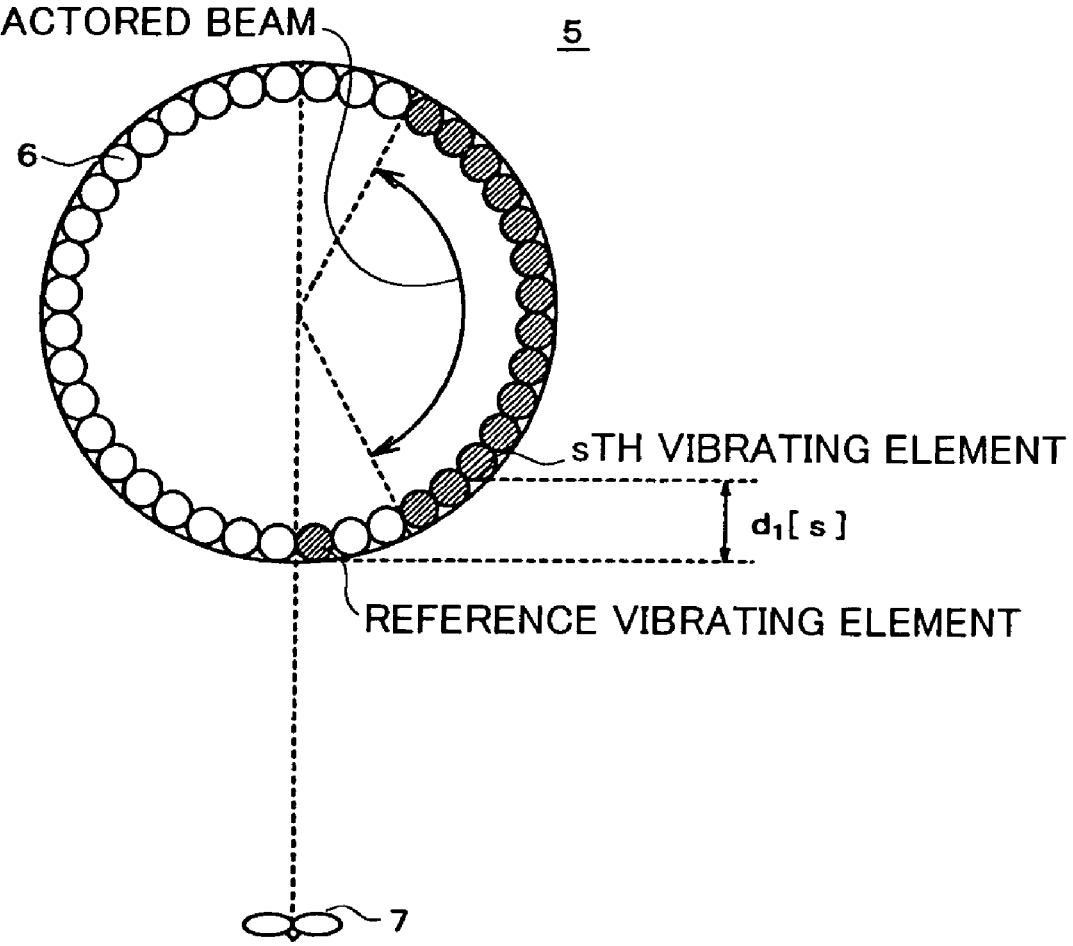
FIG. 18 is a diagram illustrating the fourth combination of signals according to the second embodiment.

If the distance between the transducer unit 5 and the propeller 7 is large, an acoustic wave incident upon each vibrating element 6 from the sine wave sound source can be regarded as a plane wave. Therefore, the adjustment factor C can be calculated relatively easily by using equation (12) below which is an approximated expression of equation (11):

$$C = \frac{1}{D(\phi_1)} \cdot \sum_{s=0}^{S-1} Wa[s] \cdot D(\phi a[s]) \cdot \exp\left[j\left\{\theta a[s] - 2\pi\frac{d_1[s]}{\lambda}\right\}\right] \quad (12)$$

where $d_1[s]$ is the distance between the reference vibrating element and the sth vibrating element as measured along the propeller direction (refer to FIG. 18).

The adjustment factors C calculated as so far discussed by the aforementioned four combinations are stored in the adjustment factor setters 35 shown in FIG. 3. When the underwater sounding apparatus 1 is used for detecting fish schools, the propeller noise is removed from the signals from which the propeller noise is to be removed (that is, from the receiver channel signals or the receiving beam signals) by using the noise compensating signals which are obtained as the product of the reference signal "A" or "B" and the adjustment factor C for each signal from which the propeller noise is removed. The adjustment factors C are dependent on the frequency (wavelength $\lambda$) of acoustic waves transmitted from the transducer unit 5. Accordingly, when acoustic waves having a different transmitting frequency are used for detecting fish schools, the adjustment factors should be recalculated at that frequency. The aforementioned arrangement of the second embodiment may be modified such that the vibrating elements 6 of the ranges "A", "B" and "C" shown in FIG. 6A or the vibrating elements 6 of the ranges "A" and "B" shown in FIG. 6B are used as vibrating elements contributing to beamforming of the reference signal, instead of the vibrating elements 6 indicated in FIG. 9.

Third Embodiment

Figure 19:
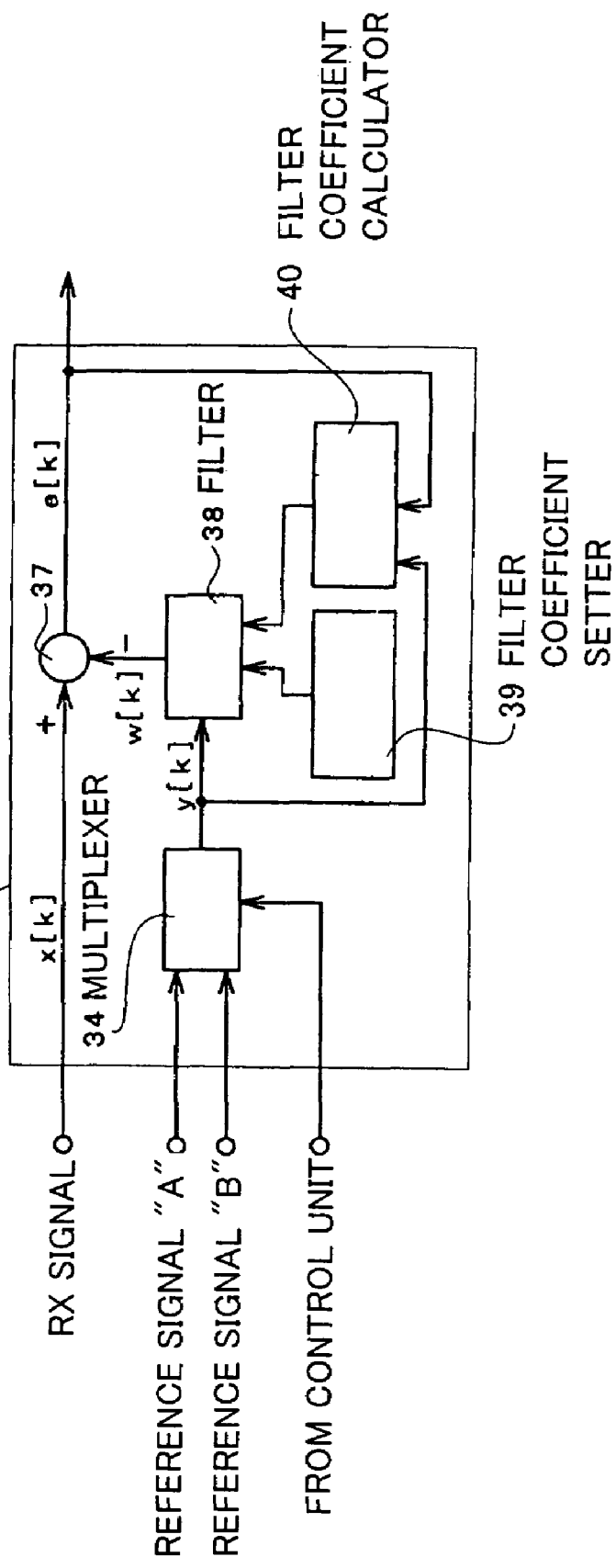
FIG. 19 is a block diagram of one of noise processing circuits according to a third embodiment of the invention.
Figure 20:
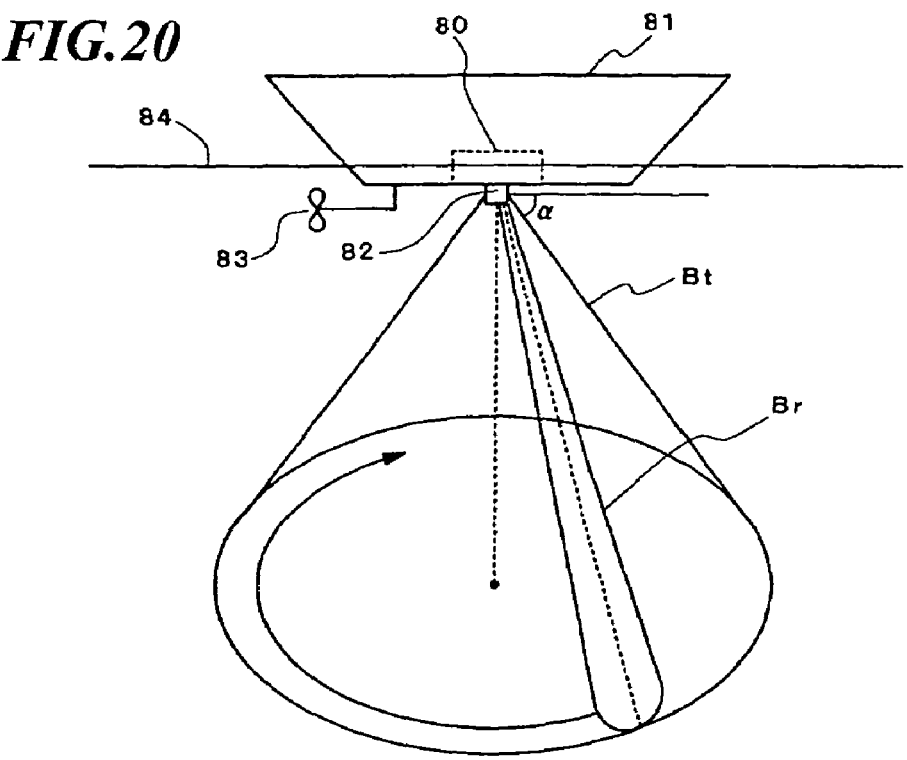
FIG. 20 is a diagram illustrating how an underwater sounding apparatus obtains information on an underwater situation.

Referring now to FIG. 19, an underwater sounding apparatus 1 according to a third embodiment of the invention is described, in which elements identical or similar to those of the aforementioned first and second embodiments are designated by the same reference numerals.

While the noise compensating signal is generated by multiplying the reference signal "A" or "B" by the adjustment factor in each noise processing circuit 33 (FIG. 3) in the first and second embodiments, a noise suppressor 3 of the underwater sounding apparatus 1 of the third embodiment includes noise processing circuits 33A which correspond to the noise processing circuits 33 of the first and second embodiments, each of the noise processing circuits 33A including a filter 38 which outputs a noise compensating signal when the reference signal "A" or "B" is input. The configuration of the underwater sounding apparatus 1 of the third embodiment is otherwise the same as those of the first and second embodiments.

Described first in the following is how each noise processing circuit 33A works when the underwater sounding apparatus 1 is used for normal fish-finding operation. The reference signal "A" or "B", whichever selected by the multiplexer 34, is passed through the filter 38 to generate a noise compensating signal. The noise compensating signal is subtracted from a received signal by a signal synthesizer 37 to remove the propeller noise from each received signal. The filter 38 is, for example, an Mth-order (e.g., second-order) finite impulse response (FIR) filter of which characteristics are defined by M+1 number of complex number filter coefficients set in a filter coefficient setter 39.

In the following discussion, the filter coefficients of the FIR filter are expressed by c[m] (where m=0 to M), complex number time-series data on received signals are expressed by x[k] (where k=0, 1, . . . ), complex number time-series data on reference signals (i.e., input signals of the filters 38) are expressed by y[k], complex number time-series data on noise compensating signals (i.e., output signals of the filters 38) are expressed by w[k], and difference signals between each received signal and the pertinent noise compensating signal are expressed by e[k]. Given these parameters, the noise compensating signals w[k] are expressed by equation (13) below:

$$w[k]=\Sigma c[m]\cdot y[k-m] \ (m=0 \ to \ M) \quad (13)$$

where the filter coefficient c[m] is defined for each of the noise processing circuits 33A (i.e., for each received signal) at a value which makes it possible to remove the propeller noise contained in the received signal by using the noise compensating signal by a method discussed below.

Described next is how each noise processing circuit 33A works when calculating the filter coefficients. The filter coefficients are calculated with transmission of the ultrasonic sounding waves interrupted and with the propeller kept turning. The control unit 20 of the underwater sounding apparatus 1 is set to the adjustment factor calculation mode by using the pertinent key(s) on the operator panel (not shown) of the apparatus 1. In the adjustment factor calculation mode, the characteristics of each filter 38 are determined by a filter coefficient (hereinafter referred to as a provisional filter coefficient) output from a filter coefficient calculator 40 provided in each noise processing circuit 33A.

The filter coefficient calculator 40 calculates a provisional filter coefficient each time a new set of time-series data on the reference signal y[k] and the difference signal e[k] is input. The filter coefficient calculator 40 repeatedly calculates and updates the provisional filter coefficient a specific number of times. When the filter coefficient calculator 40 has updated the provisional filter coefficient this specific number of times, the provisional filter coefficient last obtained is a final filter coefficient. The control unit 20 sets the filter coefficient thus obtained in the filter coefficient setter 39 or in the internal memory of the control unit 20.

The received signals x[k] and the reference signals y[k] obtained during a period when the filter coefficients are calculated together represent the propeller noise. Since the provisional filter coefficient is updated each time a new set of time-series data on the reference signal y[k] and the difference signal e[k] occurs, the provisional filter coefficient is expressed by c[m, k] (where m=0 to M). Thus, the noise compensating signal w[k] and the difference signal e[k] are expressed by equations (14) and (15) below, respectively:

$$w[k]=\Sigma c[m, k]\cdot y[k-m] \ (m=0 \ to \ M) \quad (14)$$

$$e[k]=x[k]-w[k] \quad (15)$$

A procedure of calculating the filter coefficients is now explained. First, an initial value 0 for all of (M+1) number of provisional filter coefficients is set in the individual filter coefficient calculators 40. Then, each of the filter coefficient calculators 40 calculates the values of the noise compensating signal w[k] and the difference signal e[k] by using equations (14) and (15) and updates the provisional filter coefficient by using equation (16) below each time a new set of time-series data on the reference signal y[k] and the difference signal e[k] occurs:

$$c[m, k+1]=c[m, k]+\mu\cdot y^*[k-m]\cdot e[k] \quad (16)$$

where y*[k−m] is a complex conjugate of y[k−m], and μ is a convergence factor defining the degree of convergence of values of c[m, k+1] which is repeatedly calculated by equation (16). The convergence factor μ is expressed by equations (17), for example:

$$\mu = \frac{0.2}{\sum_{m=0}^{M} |y[k-m]|^2} \quad (17)$$

Calculations by equations (14) to (16) above are repeatedly carried out the specific number of times as mentioned above (e.g., 200 times). The provisional filter coefficient eventually obtained after updating the provisional filter coefficient the specific number of times is the final filter coefficient which is used in the normal fish-finding operation. The filter coefficients c[m] are calculated simultaneously by all of the noise processing circuits 33A. The propeller noise is almost removed from the received signals by using the filter coefficients thus calculated.

While transmission of the ultrasonic sounding waves is interrupted in the above-described process of calculating the adjustment factors, transmission need not be switched off if echo signals returned from fish schools and/or sea bottom are sufficiently small as compared to the magnitude of the propeller noise, or if output power of the transmitted ultrasonic sounding waves is extremely small.

In the third embodiment thus far described, the received signals picked up by the individual receiver channels are treated as signals from which the propeller noise is to be removed and the receiving beam signals having the principal acoustic axes oriented in the propeller direction additionally produced from the received signals obtained by a specified number of receiver channels are used as the reference signals. Instead of this approach, the underwater sounding apparatus 1 may employ an arrangement in which the receiving beam signals obtained from the received signals picked up by the individual receiver channels are treated as signals from which the propeller noise is to be removed and the receiving beam signals having the principal acoustic axes oriented in the propeller direction additionally produced from the received signals obtained by a specified number of receiver channels are used as reference signals.

Also, the embodiment may be modified such that the received signals picked up by the individual receiver channels are treated as signals from which the propeller noise is to be removed and the received signals picked up by specific vibrating elements having principal acoustic axes oriented approximately in the propeller direction are used as reference signals. The embodiment may also be modified such that the receiving beam signals obtained from the received signals picked up by the multiple receiver channels are treated as signals from which the propeller noise is to be removed and the received signals picked up by specific vibrating elements having principal acoustic axes oriented approximately in the propeller direction are used as reference signals.

While the propeller noise is removed from the received signals picked up by the port and starboard-side receiver channels using signals obtained by adjusting the reference signals "A" and "B", respectively, the number of reference signals may be 1, or 3 or more.

Also, while none of the received signals obtained by the receiver channels used for producing the reference signal "A" overlap any of the received signals obtained by the receiver channels used for producing the reference signal "B" in the aforementioned embodiment, the underwater sounding apparatus 1 may be so modified as to generate reference signals "A" and "B" from received signals obtained by multiple ranges of receiver channels containing one or more overlapping receiver channels.

Furthermore, while the propeller noise is removed from the received signals obtained by all of the receiver channels in the aforementioned embodiment, the propeller noise need not necessarily be removed from the received signals derived from those vibrating elements 6 which are scarcely affected by the propeller noise.

What is claimed is:

1. An underwater sounding apparatus comprising:
   a transducer unit having a plurality of vibrating elements for transmitting acoustic waves and receiving reflected echoes from which said underwater sounding apparatus derives received signals and obtains underwater information by analyzing the received signals; and
   a noise suppressor for removing propeller noise, said noise suppressor including:
      a reference signal generator for outputting as a reference signal of the propeller noise a reference received signal which is the received signal derived from one of said vibrating elements having a principal acoustic axis oriented approximately in a propeller direction or a reference beam signal having a principal acoustic-axis oriented in the propeller direction, the reference beam signal being produced from some of said multiple vibrating elements;
      a noise compensating signal generator for outputting noise compensating signals obtained by adjusting the reference signal using adjustment factors individually defined for the received signals or for receiving beam signals produced from some of the multiple received signals; and
      a signal synthesizer for removing the propeller noise from the individual received signals or from the individual receiving beam signals by synthesizing each of the received signals or each of the receiving beam signals with the pertinent one of the noise compensating signals.

2. The underwater sounding apparatus according to claim 1, wherein said reference signal generator outputs a plurality of reference signals, and said noise compensating signal generator outputs the noise compensating signals by adjusting one of the multiple reference signals whichever correlated strongly with the individual received signals or the individual receiving beam signals.

3. An underwater sounding apparatus comprising:
   a transducer unit having a plurality of vibrating elements for transmitting acoustic waves and receiving reflected echoes from which said underwater sounding apparatus derives received signals and obtains underwater information by analyzing the received signals; and
   a noise suppressor for removing propeller noise, said noise suppressor including:
      a first reference signal generator for outputting as a first reference signal of the propeller noise a first reference received signal which is the received signal derived from one of said vibrating elements having a principal acoustic axis oriented approximately in a propeller direction or a first reference beam signal having a principal acoustic axis oriented in the propeller direction, the first reference beam signal being produced from some of said multiple vibrating elements which together form a first aperture;
      a second reference signal generator for outputting as a second reference signal of the propeller noise a second reference received signal which is the received signal derived from one of said vibrating elements having a principal acoustic axis oriented approximately in the propeller direction or a second reference beam signal having a principal acoustic axis oriented in the propeller direction, the second reference beam signal being produced from some of said multiple vibrating elements which together form a second aperture;
      a noise compensating signal generator for outputting noise compensating signals obtained by adjusting one of the first and second reference signals whichever correlated strongly with the individual received signals or individual receiving beam signals using adjustment factors individually defined for the received signals or for the receiving beam signals produced from some of the multiple received signals; and
      a signal synthesizer for removing the propeller noise from the individual received signals or from the individual receiving beam signals by synthesizing each of the received signals or each of the receiving beam signals with the pertinent one of the noise compensating signals.

4. The underwater sounding apparatus according to one of claims 1, 2, and 3, wherein said adjustment factors have values calculated by using received data on the reference signal or the first and second reference signals and each of the received signals or each of the receiving beam signals obtained when the propeller is kept turning.

5. The underwater sounding apparatus according to one of claims to 1, 2 and 3, wherein said adjustment factors have values calculated by using a positional relationship between the propeller and each vibrating element, directional characteristics of each vibrating element and the wavelength of the transmitted acoustic waves.

6. The underwater sounding apparatus according to one of claims to 1, 2, 3, 4 and 5, wherein each of said adjustment factors is the ratio of the complex amplitude of one of the received signals or one of the receiving beam signals to the complex amplitude of pertinent one of the reference signals or the first or second reference signals obtained when the propeller noise is approximated by sine waves having the same frequency as the frequency of the transmitted acoustic waves.

7. An underwater sounding apparatus comprising:
   a transducer unit having a plurality of vibrating elements for transmitting acoustic waves and receiving reflected echoes from which said underwater sounding apparatus derives received signals and obtains underwater information by analyzing the received signals; and
   a noise suppressor for removing propeller noise, said noise suppressor including:
      a first reference signal generator for outputting as a first reference signal of the propeller noise a first reference received signal which is the received signal derived from one of said vibrating elements having a principal acoustic axis oriented approximately in a propeller direction or a first reference beam signal having a principal acoustic axis oriented in the propeller direction, the first reference beam signal being produced from some of said multiple vibrating elements which together form a first aperture;
      a second reference signal generator for outputting as a second reference signal of the propeller noise a second reference received signal which is the received signal derived from one of said vibrating elements having a principal acoustic axis oriented approximately in the propeller direction or a second reference beam signal having a principal acoustic axis oriented in the propeller direction, the second reference beam signal being produced from some of said multiple vibrating elements which together form a second aperture;

filters provided individually for the received signals or for receiving beams formed by the multiple received signals for outputting noise compensating signals obtained by processing one of the first and second reference signals whichever correlated strongly with the individual received signals or receiving beam signals; and a signal synthesizer for removing the propeller noise from the individual received signals or from the individual receiving beam signals by synthesizing each of the received signals or each of the receiving beam signals with the pertinent one of the noise compensating signals.

8. The underwater sounding apparatus according to claim 7, wherein said filters have filter coefficients of which values are calculated by using received data on the first and second reference signals and each of the received signals or each of the receiving beam signals obtained when the propeller is kept turning.

* * * * *